A FUNCTION OF INTENSITY

INVENTORS
ROBERT E. FEARON
JEAN M THAYER
BY Robert K. Schumacher

ATTORNEY

Sept. 8, 1959 R. E. FEARON ET AL 2,903,594
METHOD AND APPARATUS FOR MEASURING THE DIRECTION SENSE OF
DIRECTION AND ENERGY OF IONIZING PROCESSES
Original Filed July 30, 1949 7 Sheets-Sheet 3

INVENTORS
ROBERT E. FEARON
JEAN M. THAYER
BY
Robert K. Schumacker
ATTORNEY

Sept. 8, 1959 R. E. FEARON ET AL 2,903,594
METHOD AND APPARATUS FOR MEASURING THE DIRECTION SENSE OF
DIRECTION AND ENERGY OF IONIZING PROCESSES
Original Filed July 30, 1949 7 Sheets-Sheet 4

INVENTORS
ROBERT E. FEARON
JEAN M. THAYER
BY
Robert K. Schumacher
ATTORNEY

United States Patent Office 2,903,594
Patented Sept. 8, 1959

2,903,594

METHOD AND APPARATUS FOR MEASURING THE DIRECTION SENSE OF DIRECTION AND ENERGY OF IONIZING PROCESSES

Robert E. Fearon and Jean M. Thayer, Tulsa, Okla., assignors to Well Surveys, Inc., a corporation of Delaware Original application July 30, 1949, Serial No. 107,806, now Patent No. 2,712,081. Divided and this application April 19, 1954, Serial No. 424,104

21 Claims. (Cl. 250—83.6)

This invention relates generally to a method and apparatus for identifying substances existing in difficultly accessible locations, for example, adjacent to a deep narrow drill hole, and more particularly to a method and apparatus for identifying and distinguishing these substances from each other by nuclear reactions in the substances. This is a division of our copending application Serial No. 107,806, filed July 30, 1949, now Patent 2,712,081, for a Method and Apparatus for Neutron Well Logging.

This invention is directed to the solution of a problem which has been long recognized by geologists and geophysicists, and by others, confronted with the problem of locating valuable substances, such as petroleum, in the sub-surface formation of the earth. The problem of discovering with certainty the existence of a particularly valuable substance in the sub-surface formations of the earth has only been partially solved by the prior art workers. All prior efforts to solve the problem have met with failure for the reason that no parameter could be found which was solely characteristic of the valuable substances that it was desired to locate. As an example, in the art of well logging a partial solution to the problem goes as far as determining with certainty that either salt water or petroleum exists in a particular formation but a complete solution is not possible, since prior to this invention, no parameter was known whereby the two substances could be distinguished, in situ, from each other.

Numerous other methods advanced by the workers in the prior art for locating valuable substances in the sub-surface formations of the earth include: electrical methods which involve the measurement of self-potential, conductivity, and resistivity; thermal methods; seismic methods which treat of the acoustical properties of the sub-surface formations; natural radioactivity of the formations; and those methods in which the formations are irradiated with radioactive radiations and an effect such as the gamma radiation produced by the neutron interactions in the formations measured. All of these methods as well as others which have not been enumerated above, have not afforded a complete solution to the above problem in that none of them measures a parameter that is solely characteristic of the valuable substances that one is desirous of locating.

For the purpose of particularly describing and setting forth and respects in which this invention differs from and represents advancement upon the prior art, there is set forth a description of the efforts of previous workers insofar as they have been directed to the problem which has been stated in the previous paragraph.

The location of petroleum has been attempted by various well logging methods which are sensitive to some physical characteristic imparted to the rocks by the presence of petroleum in them. For example, resistivity methods in combination with other methods somewhat ambiguously enable detection of petroleum. The inconvenience and uncertainty of the use of resistivity methods arise from the fact that resistivity is a general property of rocks, and is possessed by some rocks not containing petroleum to an even greater extent than the degree to which the property is manifested by certain other rocks full of petroleum. For example, Indiana limestone will be found to have a much higher resistivity than oil saturated sandstone of the Frio formation in the Gulf Coast oil fields. Furthermore, sandstone which contains natural gas, has a high resistivity, as does also coal. Moreover, limestone may show a decrease of resistivity where an oil bearing horizon appears. It could similarly be shown how each and every one of the other nonnuclear logging methods have specific shortcomings which analogously prevent them from being or amounting to a specific recognition of petroleum.

The instant invention provides a complete solution to the above problem. This solution consists of a system of observations by which the operator is enabled to recognize and quantitatively measure nuclear species of the sub-surface formations adjacent a bore hole. Although the desired substances quite often are not elements or single nuclear species the chemical laws of combining proportions enable accurate appraisal of such things as the occurrence of petroleum. Recognition of nuclear species is accomplished by subjecting the substance adjacent to the bore hole to bombardment with penetrating radiations of a nature to cause specific and determinative quantized changes in the potential energy of the said nuclear species. These quantized energy changes which are specific to the particular kinds of atoms to be determined are used as a means of recognizing the desired atoms, which recognition is accomplished by means of selective neutron detection, selective for specific energy ranges of neutrons, and/or specific limits of direction of incidence and sense of direction of incidence.

Among the means which are required for the solution of the above problem, there is provided exceedingly powerful and energetically efficient monoenergetic neutron sources, relying upon the nuclear reactions caused by electrical or electromagnetically accelerated particles. These are provided in a form which is adapted to be lowered into a bore hole, and employed therein to bombard the rocks adjacent to the bore hole. Also required for the practice of this invention are powerful capsuled neutron-emitting sources, depending for their operation upon energetic particles emitted by radioactive substances. There is set forth the manner of choosing and designing such neutron-emitting sources, showing how a person skilled in the art can avail himself of intensities hundreds of times greater than those which are now available.

Required in the practice of this method are various means of observing neutrons which permit the determination of the energy, the direction of incidence of neutrons, and the sense of direction.

Among these means, there are provided devices which determine both energy and direction of incident neutrons within certain limits. There is also provided a device for detecting phenomena described in nuclear physics as n-p reactions. This device enables exact determination of energy of neutrons, and a somewhat ambiguous determination of direction. Incidental to the practice of this invention also is a device for resolving nuclear data which gives only a general indication of energy, and interpreting this general indication of the energy of neutrons in a more exact way. There is also provided, as a means of practicing this invention, a choice of the manner of employment of a number of neutron filters adapted to select specific energy groups of neutrons. It is shown how these filters may be employed for the purpose of identifying specific elements in the strata.

Therefore the primary object of this invention is the provision of a method and apparatus for identifying valuable substances by separately measuring the influence of specific properties of the nuclei of the valuble substances upon a flux of fast neutrons.

Another important object of this invention is the provision of a method and apparatus whereby petroleum can be positively identified in the subsurface strata adjacent a bore hole.

This invention also contemplates a method and means for locating valuable substances situated in difficulty accessible locations by identifying and measuring the influence of at least one of its elementary components on a flux of fast neutrons.

Still another object of this invention is to achieve the above objects by irradiating formations with fast neutrons and measuring the intensity of neutrons falling within specific energy bands and which have rebounded from the formations.

Another object of this invention is to provide a method and means for producing a log of a drill hole by recording versus depth the average rate of occurrence of processes occasioned by fast neutrons of selected energies which enter the detecting device.

A further object of this invention resides in the provision of a method and means for detecting neutrons, selecting pulses produced thereby whose energies lie in a predetermined range, and recording their time-rate of occurrence versus depth.

Another object is to provide means for delivering to a recorder electrical signals which denote the intensity of neutrons of a definite energy class.

This invention also contemplates means for determining specific energy losses in samples of substances exposed to neutrons of a determined energy for the purpose of adjusting energy selective neutron detector systems used in well logging.

Another object is to provide a method and means to accomplish deep investigation in a direction perpendicular to a bore hole and concurrently provide very detailed resolution of thin strata.

Still another object is to provide detectors which are directionally sensitive and which are adjusted with respect to the source for favorable angle of fast neutron scattering from formation substance that are capable of determining variations of the properties of strata with distance horizontally.

This invention also contemplates a novel detector whereby dip determinations can be made in a drill hole.

Another object of this invention is to provide a detecting system whereby horizontal anisotropy can be detected.

Still another object is to provide means for detecting horizontal anisotropy in a measurement based upon a particular energy of neutrons.

A further object is to provide a detecting system whereby vertical direction sensitivity and sense of direction of neutrons of a particular energy can be detected.

Another object is to measure the energy of pulses having a particular energy.

Other objects and advantages of the present invention will become apparent from the following detailed description when considered with the drawings, in which:

Figure 4 shows in perspective a vertical section of a novel detector;

Figure 1:
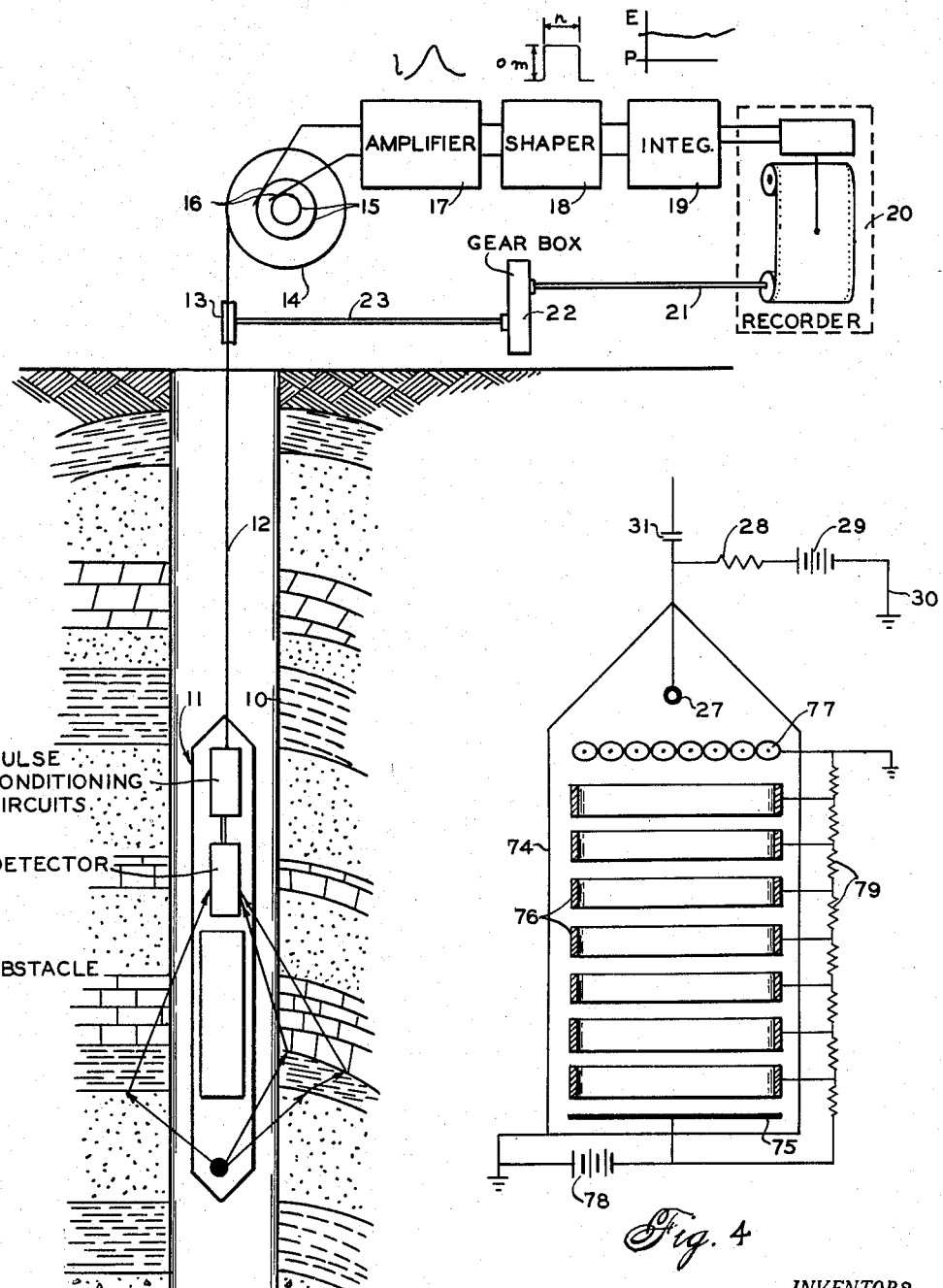
Figure 1 is a schematic illustration of a well logging operaiton showing the surface recording system.

As pointed out above, consideration of the problem of well logging has led to the conclusion that there is a necessity for the discovery of methods which will identify more specifically the substances found in the rocks adjacent to wells which are logged. Specific identifying properties, which could be relied upon as a means of recognition of substances, must be able to cause an effect which is observable under the logging conditions which prevail. Preferably the process making the observations possible should be one which acts through space and through matter which fills the space between the position in which the rock to be identified is found, and the location of the detecting apparatus in the bore hole. The necessity for acting through space arises because of the prevalence of casing and/or cement and/or fluid of various sorts which commonly exist in the well bores, and which interfere with the measuring process. Another reason why considerable action through space is essential is the need for the depth of investigation to be adequate. Considerable depth of investigation is a highly desirable factor in well logging because of the heterogeneity of rocks making shallow observations unrepresentative, and therefore inaccurate as a representation of the whole mass of rock penetrated.

There are available at the present time only a very few types of influences by which desirable observations as discussed above may be made. Obviously, the magnetic and electric fluxes are not available for consideration in connection with cased wells, and the electric flux is unusable when investigating non-conducting material. The observation of the heat flux is familiar in the art of well logging and has patently the disadvantage that such observations are slow if one desires a considerable depth of investigation. The transmission of observable infrared and ultraviolet radiations is excluded because of the opacity of substances generally present in the earth and in bore holes. The gravitational flux has satisfactory properties, and, in principle, could be measured. But no known means of measuring it for well logging purposes has been found.

In attacking the above problem, seeking for a method of specific recognition of material in the circumstances of a bore hole penetrating the rock strata of the earth, it has been discovered that there are apparent specific properties of atomic nuclei corresponding with energy transitions in those nuclei. These transitions may evidence themselves in a variety of ways, such as:

a. The emission of radiant energy through space.

b. The absorption of a particular amount of energy from a bombarding particle or quantum.

c. A specific energy threshold or a plurality of energy thresholds of susceptibility of the nuclei to certain classes of nuclear change, which may be caused by bombarding corpuscles or quanta.

It has been discovered that in all branches of molecular, atomic, and sub-atomic physics, one may generally predict that if a specific energy transition is possible in a quantized system, there will be a resonance effect, specifically affecting bombarding particles or quanta possessing energy (either kinetic or potential) in the close vicinity of the amount required to produce a quantized transition. The discovery of the details of quantization of nuclei of atoms still waits for extensive experimental and theoretical work. Limited experimental evidence has already brought support to the conviction which exists in the minds of all nuclear physicists to the effect that nuclei will surely be found to be quantized systems. In some instances energy thresholds of various kinds have already been determined for nuclei. For example, the photo-neutron threshold is now known experimentally through the study of its inverse process, capture, by Kubischek and Dancoff.

A specific energy threshold at 20 megavolts has been found for the system comprising 4 nucleons (2 protons and 2 neutrons). Sundry isomeric transitions corresponding with highly forbidden transformations of the arrangements of nucleons have been found experimentally and can be considered as additional evidence of the truth and experimental significance of the general conclusion that nuclear matter exists in quantized energy states.

In an effort to make use of the foregoing general conclusion, it has been discovered that only two classes of radiation appear to exist which react with nuclear matter appreciably and can be arranged conveniently for the observation of quantized energy levels of nuclei. These classes of radiation are the photon or electromagnetic class, and the corpuscular class comprising neutrons. Other particles (charged) in general do not penetrate the coulomb field of force surrounding a nucleus at energy falling in the range of possible excitation processes of common nuclei. Such excitation processes are typically expected for light nuclei in the vicinity of 1 million electron volts.

Charged particles lack action through a distance as defined herein. Therefore, corpuscular radiations of the charged variety would, in principle, not be particularly useful for investigation of the quantized levels of nuclei. Of the classes of radiation which have been suggested, the only one which has been discovered which has a favorable ratio for the amount of interaction which it undergoes with nuclear matter, as compared with the energy transitions effected in the progress of the radiation by circumstances arising outside the nuclei of atoms, is the neutron. The photon reacts extensively with orbital electrons, and has only a very small cross section (target probability) for interactions with nuclei as such. There is furthermore an additional reaction of photons which becomes prominent above 2 electron megavolts, and which, in the range above 2 electron megavolts results in materialization of electron-position pairs. This materialization, through influenced by the presence in the near vicinity of the nuclear field of force, does not represent a specific or identifying characteristic of particular nuclei, but is a general characteristic of all nuclei, more prominent for the nuclei of light elements such as aluminum. For the above listed reasons, there appear to be only a few especially simple reactions caused by photons which might be of any use. One might find it desirable to observe the neutrons released from nuclei by photons, since there is, for such nuclear photo-neutrons, a specific threshold of energy for each nuclear species (element or isotope thereof). One might also investigate the "unmodified" Compton scattering of energetic photon radiations in the hope of finding some slightly modified lines which suffered loss of energy by interaction with nuclei. This possibility is somewhat favored by the fact that the otherwise much stronger modified Compton scattering radiation is rapidly eliminated from the flux by absorption.

On the other hand, the interaction of neutrons with the outside parts of the atom is so small that the direct production of ion-pairs by neutrons is found to occur on an average of only about one time per meter of ordinary atmospheric air for a neutron possessing a kinetic energy of five million electron volts. The liberation of energy by neutrons in air therefore amounts to less than one thousandth of 1% per meter of air traversed, for energy liberated by processes involving the outside portions of the atoms found in the air. A distance of travel in air which would result in an average loss of energy by reaction with outside parts of the atoms of less than 1%, would, nevertheless, result in total absorption of the neutrons, and all their energy, by reaction with the nuclei of the atoms contained in air. Even so, many of the reactions which neutrons undergo, which occur between neutrons and nuclei of the matter, are not highly specific, nor do they aid in any refined efforts to identify such matter. Among the unidentifying nuclear reactions one may name, for example, conservative ballistic nuclear scattering of neutrons, that is, conservative of total kinetic energy. This process is specifically different to an extreme degree only in the case of very light elements such as hydrogen and helium. The average nature of other matter contained in the rocks is sufficiently alike in this respect that the main possibility of use of the property of conservative ballistic nuclear scattering of neutrons is to observe differences in the propagation of neutrons through the rock which enable conclusions regarding the presence of hydrogen to be made. This effect is already made use of, and there exist a considerable number of U.S. patents and other published descriptions bearing on this subject. Among these patents are No. 2,308,361, No. 2,220,509, and No. 2,349,712. The broad class under which these previously named inventions fall corresponds with a patent issued to John C. Bender, No. 2,133,776.

The theory of detection of hydrogen by conservative ballistic nuclear scattering is treated in an article written by Robert E. Fearon and published in the June 1949 issue of Nucleonics, entitled "Neutron Well Logging."

Figure 2:
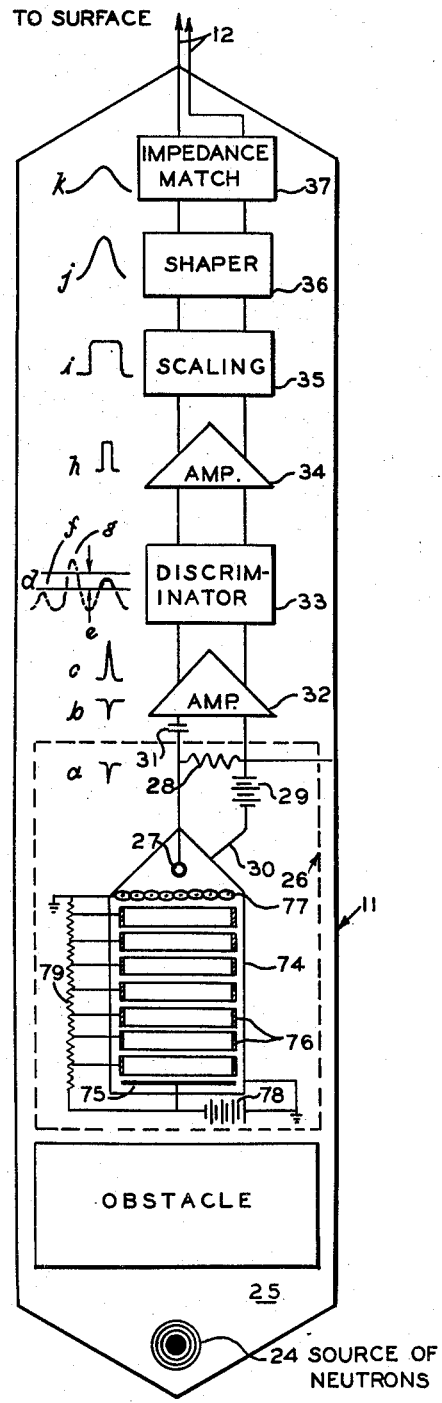
Figure 2 is a diagrammatic illustration of a sub-surface instrument with the detector illustrated in vertical section.

The above theory finds general application in pursuing this method, and Figures 1 and 2 more particularly set forth the details of arrangements through which these general concepts find specific application to the problem set forth above.

Referring to these figures there is illustrated an application of this invention to a well surveying system. In Figure 1 there is shown schematically a drill hole 10 which may or may not be cased. Disposed in the drill hole and adapted to be raised or lowered therein is a housing 11 supported by a cable 12. Cable 12 comprises at least one electrical conductor connecting the electrical apparatus within the housing 11 to apparatus located adjacent the mouth of the drill hole 10. The apparatus on the surface of the earth consists of a measuring wheel 13 over which the cable 12 passes and a winch or drum 14 on which the cable is wound, or from which it is unwound, when the housing 11 is raised or lowered in the drill hole 10. Conductors are connected to the cable 12 by means of slip rings 15 and brushes 16 carried on one end of drum 14. These conductors lead to an amplifier 17. Amplifier 17 is a conventional audio amplifier having a flat frequency response. The output of amplifier 17 is conducted to a pulse shaper 18, the purpose of which is to insure the delivery of square topped waves of constant height to an integrator 19. Integrator 19 is adapted to receive the aforementioned pulses and generate therefrom an electromotive force which is proportional to the average time-rate of occurrence of the pulses. This signal is delivered to the recorder 20 where it is recorded versus depth. The depth axis of the recorder is actuated by the shaft 21 which leads from a gear box 22, connecting through shaft 23 the measuring wheel 13. The gear box 22 has adjustments to enable suitable choice of depth scales.

Referring specifically to Figure 2 a description of the contents of housing 11 will follow. It is to be understood that housing 11 will be constructed to withstand the pressures, and mechanical and thermal abuses encountered in surveying a deep bore hole and yet provide adequate space within it to house the necessary apparatus and permit the transmission of radiation through it.

In the bottom portion of housing 11 there is located a radiation source 24 which may be surrounded by a radiation filtering material 25. This radiation source may take various forms which will be described in detail later in the specification. Above the filtering material 25 and lying between the source of radiation and a radiation detector 26, there is a region of space which may be occupied by suitable materials or left vacant determined by considerations explained as the description progresses.

The detector 26 is of the type which will detect neutrons as a result of the production of prominent bursts of ionization therein, caused by rapid movements of heavy charged particles such as protons, alpha particles, etc., set in motion by the neutrons. The bursts of ionization are very quickly collected in the detector 26. These bursts are registered as electrical pulses and resolved timewise from other or smaller pulses which may occur almost concurrently. The detector 26 is so designed and so operated that the magnitude of the electrical pulse released from the collection of a specified amount of electrical charge will always be quite accurately proportional to the amount of the electrical charge collected and substantially independent of the path in the detector along which the burst of ionization occurred.

The current corresponding to a pulse, flowing in the electrode circuit which includes conductor 27, resistance 28, battery 29 and conductor 30, produces a voltage pulse across the resistance that is of the form illustrated at $a$. The pulse produced across the resistance 28 is impressed through the condenser 31 upon the input of an amplifier 32. As shown at $b$ the pulse has suffered negligible loss and no distortion in passing through the condenser 31. The amplified pulse, illustrated at $c$, has been inverted in polarity but otherwise faithfully reproduced. It is then conducted to the pulse height distribution analyzer 33. Here only those pulses whose magnitude fall within a prescribed range, such as illustrated at $d$ and designated by $e$, are accepted and transmitted. Other pulses such as are illustrated at $f$ and $g$ are not accepted and transmitted. Those pulses which are accepted and transmitted are delivered to an amplifier 34. Amplifier 34 is one having a flat frequency response extending upward to the highest frequency required to faithfully amplify the pulse delivered to it in a manner shown at $h$. The output signal from the amplifier 34 is fed into a scaling circuit 35 which, in a known manner, delivers pulses as illustrated at $i$, the number of which, occurring in a given time is less by a constant factor than the number received in the same interval of time. The output of the scaling circuit is fed into a shaper 36 which transforms the pulse into the shape illustrated at $j$. The shaper 36 may take the form of a powdered iron core transformer. The signal from the transformer is then fed into impedance matching means 37, such as a cathode follower, which faithfully reproduces the voltage wave as illustrated at $k$. The impedance matching means 37 introduces the signal into the transmission line contained within the cable 12 for the purpose of transmitting it to the surface.

It is to be understood that all elements within the housing 11 which require power may be powered in a conventional manner as taught in the art by means such as batteries or rectified alternating current. Batteries which very satisfactorily fulfill the temperature requirements in hot wells are the zinc, potassium hydroxide, mercuric oxide cells.

Figure 3:
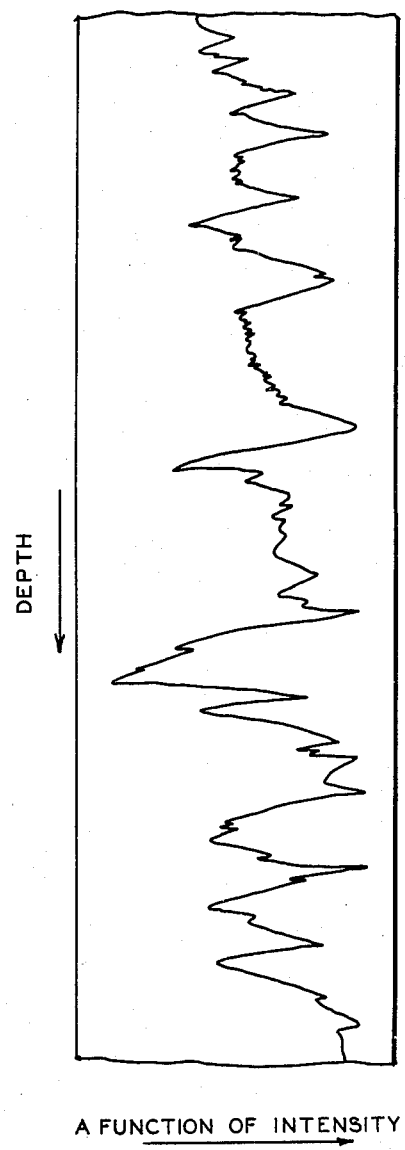
Figure 3 illustrates the type of well log that would be produced by the present invention.

Again referring to Figure 1, the signals transmitted to the surface by means of cable 12 are taken therefrom by means of slip rings 15 and brushes 16 and are conducted to the amplifier as pulses, one of which is illustrated at $l$. These amplified pulses are received by a pulse shaper 18 which modifies their form in the manner illustrated at $o$. The pulse illustrated at $o$ will always have a fixed square form with a fixed height $m$ and a fixed width $n$. These substantially square pulses are then fed into the integrating circuit which delivers the signal to the recorder 20, as has been previously described. The integrating circuit thus produces a time-dependent voltage wave such as shown at $p$. When this signal is impressed on the recorder, which has been coordinated with depth, a curve will be drawn as shown in Figure 3. This curve has its ordinate depth in the bore hole and as its abscissa a function of an intensity of received radiation, or of a plurality, or combination of intensities. These intensities may be combined by adding, subtracting, or dividing in any desired manner, or may be otherwise mathematically combined. The manner of combination is suitable to specifically indicate, or be especially sensitive to, the presence of a particular substance in the region adjacent the bore hole.

Although no power supply has been shown in connection with the surface apparatus, it is to be understood that it will be powered in a conventional manner such as was pointed out in connection with the sub-surface apparatus.

This invention includes a particular type of radiation detector which has been invented and heretofore constructed and tested, together with certain improvements which have also been discovered. This improved radiation detector consists of an ionization chamber containing a gas of very low molecular weight, sufficiently low that, when a molecule or atom thereof is struck by a neutron, considerable of the kinetic energy of the neutron is likely to be transferred to the molecule or atom. Adequate pressure must be maintained in this detector, so that the number of atoms of the target substance contained in it will be sufficient per unit of volume for a small detector adapted for well logging (of the order of 3⅝" outside diameter) to have a usable efficiency. It is contemplated in this respect that pressures will be employed which will lie in the range of from one to several atmospheres, extending upward to the vicinity of 300 atmospheres. It has been found that, for the observation of electrical impulses which will be caused when the atoms of this contained gas are struck by neutrons and proceed to liberate their energy by moving through the remaining portion of the gas it is necessary to choose a gas which does not, under the conditions of the use of the detector, permit the formation of negative ions of molecular size from the electrons which are freed by the passage of the recoiling atom. The electrons are thus permitted to remain free, and may be very quickly collected, distinguishably from the heavy ions of positive charge which remain, and which are set in motion very much more slowly, and are relatively unobserved. Such a detector is illustrated generally in Figure 2 and more specifically in Figure 4.

As shown in both figures a housing 74 encloses a system of electrodes disposed in an atmosphere of compressed helium. Electrode 75 in the form of a cylindrical plate is disposed in the bottom of, but insulated from, the housing 74. Ring-shaped electrodes 76 are arranged in spaced relationship, one above another, and insulated from each other and from the housing. The axes of all these rings are coincident and coincide with the axis of the housing. Each ring by itself may be said to lie generally in a plane perpendicular to the axis of the housing 74. The vertical distances between the successive planes passing through the centers of successive rings, are equal. A screen 77 is situated at the top of the system of rings and also lies in a plane perpendicular to the axis of the detector. Screen 77 is electrically connected to and supported by the inner surface of the housing 74 and divides the space within the housing into two parts. The lower portion contains the greater part of the internal volume. The portion of space above the screen 77 contains an electrode 27 which is maintained at a strong positive potential with respect to the housing 74 by means of the battery 29 which is connected to the resistance 28. The circuit is completed to the case by virtue of the connection of the cathode of battery 29 to ground through the conductor 30. The electrode 75 and rings 76 are electrically connected to a battery 78, and coupled by equal resistors 79 in such a manner that the numerical value of the negative potential from the first of these electrode elements 75 and 76, steadily and evenly decreases toward ground potential referenced from the bottom electrode to the top electrode inside the housing 74. The effect of these electrodes 75 and 76, and of screen 77, is to produce a uniform straight electric field, directed downward along the axis in the greater part of the interior of the chamber, everywhere except in the close vicinity of the rings 76. If an ionizing path occurs in the helium below the screen in the region of electrode elements 75 and 76, the electrons thus released are immediately translated upward toward the screen 77. Some are absorbed by the screen and are lost, but a larger number, and a relatively large and constant fraction of the total number pass through, and are attracted toward the collector electrode 27, where they are collected, causing an electrical impulse to occur in the external circuit, coupled through condenser 31. The pressure of the helium is chosen with respect to the use which it is desired to make of the detector. The specific choice of pressure in a given case will correspond with a value for which the range of the most energetic recoiling helium atoms will be appreciably less than the diameter of the rings 76, but the range of electrons of like energy will be much more than the diameter of these rings. The neutron detector of Figures 2 and 4 may be employed for the detection of fast neutrons, since slow, or thermal ones do not produce observable recoil processes. As such, it is a detector which observes fast neutrons, and can be used to observe them in the presence of slow ones without being influenced by the slow ones. Also it is able to ignore gamma rays by the choice of pressure which renders inefficient the ionization of its atmosphere by gamma rays. Thus, while gamma rays will cause pulses to be generated in this detector they will be of lesser energy per pulse, and may, therefore, be eliminated.

The detector of Figures 2 and 4 may also be used to detect slow neutrons, or to observe n-p reactions on substances which may be mixed with the helium. All these uses of the detector of Figures 2 and 4 enable determination to be made of the energies of the fast neutrons impinging on the detector, as will be fully shown further on as the description progresses.

It has been found that the gases of chemical group zero do not form negative ions when approached by electrons. Use has been made of this fact in certain counters arranged for the measuring of alpha particles. Such counters have been constructed which use noble gases at atmospheric pressures or lower pressures. There is, contrary to previous theoretical considerations, an appreciable rate of recombination in the noble gases for ions produced therein. It has been satisfactorily demonstrated that such recombinations are not caused by third body processes or by wall effects, but are specific and inherent physical characteristics of the noble gases themselves. These findings regarding the rate of recombination do not, nevertheless, exclude the use of these gases, at elevated pressures. On the other hand, Biondi has recently found that a much higher rate of recombination prevails for hydrogen. The pressure limitation for the production of electron-caused quick pulses from hydrogen will therefore be much lower than the corresponding limitation for helium. Helium is preferred over hydrogen for use in this radiation detector at elevated pressures. The recoil of helium from a neutron derives from a square hit roughly 3/5 of the kinetic energy of the neutron. In the case of a 10 million electron volt neutron, the recoil could have nearly 6 million electron volts energy, and would correspond with an alpha particle having a range approximately 6 centimeters in standard air. The liberation of energy by such an alpha particle in standard air would be about the same as it would be in helium at seven atmospheres. The dimensions of a chamber in which such a recoil could efficiently liberate its energy are therefore not excessive for any pressures above fourteen atmospheres of helium.

It is necessary to produce a pulse having a size which corresponds with the number of electrons liberated by the recoil, and which always has the same size for alpha ray paths liberating the same number of electrons, but liberating them in different parts of the ionization chamber. This result may be accomplished by an arrangement like that described in U.S. Patent No. 2,469,460. Pulses proportional to the number of electrons initially released may also be produced by the use of a relatively fine wire for the center electrode and a sufficiently strong electric field in the vicinity of the center electrode to bring about gas amplification, that is, an incipient avalanche, in the close vicinity of the fine wire. Also the neutron detector, as shown in Figures 2 and 4, accomplishes this purpose and it may be used as a point proportional counter by connecting a suitably high voltage battery at 29. Any of these methods will result in pulses which are proportional to the number of electrons initially liberated and substantially independent of the potential difference through which the electrons initially liberated have fallen. If these precautions are not taken, pulses will occur in which the influence of each primary electron is multiplied by a weighting factor which is the potential difference through which it falls in arriving at the collector electrode from the point at which it originated. Since the weighting factors which have been mentioned are not dependent upon the characteristics of the electric field in the measuring apparatus, and since the use of these weighting factors cause pulses absorbing the same amount of radiant energy in the chamber to bring about the transfer of different amounts of energy into the electrical output, and since they also cause pulses for which different amounts of radiant energy were liberated in the chamber to effect transfer of equal amounts of electrical energy into the output, on a chance basis; the use of an ordinary ionization chamber will result in great confusion, and will prevent, or tend to prevent, the clear recognition and classification of nuclear phenomena as they occur in the ionization chamber. It is understood that in pursuing this method, it is intended to make use of such special detecting methods as are described herein. There are certain ways of practicing this invention which do not require the use of a special detector. Note shall be taken of these exceptions, and it will be pointed out that the detector may be more freely designed in such cases.

A quicker collection of electron charge is achieved in ionization chambers which contain at least sufficient diatomic or polyatomic molecular gases to furnish means of dissipating the energy of electrons wherever their energy becomes appreciably higher than the value that would correspond with equipartition of energy, under Maxwellian statistics of the gas. Where such polyatomic molecules or other dissipants of energy are not present, as for example, in an ionization chamber filled exclusively with very pure helium, there is no mechanism which enables an electron to lose its energy at all efficiently unless it has acquired energy more than that which corresponds with the first quantized state above ground level for the extranuclear electron shells of the helium atom. Since this first transition corresponds with a few volts, the electron gets out of true equilibrium with its environment, wherever it is able to derive kinetic energy from an electric field, and while its motion remains random in direction except for drift with the field, the average energy nevertheless will correspond with a tremendously high temperature of the order of tens of thousands of degrees centigrade. It will shortly be seen how this very high electron temperature interferes with efficient and desirable registration of the pulses.

A mixture of electrons and gas atoms bears a resemblance to a mixture of two kinds of gas. So long as the electrons remain, they will diffuse about randomly in the gas, tending to fill up, and uniformly so on the average, all places where electrons are present to a less extent than the average amount in the mass of gas considered. On the other hand, those places which at the beginning of a diffusion process contain more than their share of electrons will have their concentration reduced in the direction of the average value by diffusion. Electrons diffuse very rapidly. An electron having an energy corresponding with room temperature (about .04 electron volt) diffuses about one hundred times as fast as helium. Also, the rate of diffusion of electrons rises as the square root of the temperature corresponding with the average kinetic energy per electron. At 30 thousand degrees, a temperature which might be attained by electrons in drifting with an electric field in pure helium, the rate of diffusion would be approximately 17 thousand times the rate of diffusion of helium. Now it happens that electrons which cause pulses always originate in a non-uniform distribution within the gas where they are produced. A recoiling helium atom energized by a collision with a fast neutron will travel in helium and in an approximately straight path, in a typical case, and will, at fourteen atmospheres, liberate electrons at a rate of approximately $2 \times 10^4$ per centimeter of travel, with an even more concentrated liberation per unit path near the end of the travel of the energized recoil atom. The electrons liberated along this path are suddenly set into motion by the electric field, if the path occurs in a mass of helium upon which an electric field is superimposed. These electrons, however, not only drift with the electric field, but also have random energies of motion like the other molecules or atoms in any gas not at absolute zero. Therefore, as the cluster of electrons initially liberated by the travel of the recoiling energized atom starts toward the collector electrode, the random motions are continuously superimposed upon the consistent drift toward the collector electrode. The random motions have the effect of causing some of the electrons to arrive early and some of them to straggle behind the main group which is drifting toward the collector electrode. The net result is that the corresponding electrical pulse is broadened with respect to time; that is, it is made to last longer than it would if there were no early arrivals and no stragglers. Now, the more intense the random motions, the greater will be the amount of spreading, and the more numerous and the more early will the early arrivals be and the more numerous and more late will the late comers be. Therefore, if the electrons acquire greater energy of random motion than they should, the pulse of charge will not arrive in as clear cut and quick manner as would be desired. This defect will be observed particularly in the case where absolutely pure gas of group zero is employed in an ionization chamber or where a mixture of such gases is employed. For such gases, the electron drifting parallel to the direction of the field tends to impart its extra energy, resulting from its fall through a potential difference, to the atoms of the gas by colliding with them, and it makes one such attempt for every such collision. However, it is very nearly impossible for an electron to transfer energy to an atom in a ballistic encounter. This is because the lightest atoms that are known, for example, helium and hydrogen, are thousands of times more massive than an electron. An electron containing extra energy, and attempting to impart this energy ballistically to a helium atom will lose approximately one seven-thousandth of its energy per encounter. In an ionization chamber containing helium at atmospheric pressure, it is quite easily possible to collect an electron from the space of an inch or so thickness in a period of time so short that only a few thousand encounters will have occurred.

Quite obviously, then, the electron would not be promptly losing the energy that it gains from the electric field, at least not by ballistic encounters, but the energy would rise until it reached a level so high that more effective means of transferring its energy to helium atoms would come into play, that is, the transfer of energy will be effected through inelastic collisions resulting in the transferences of potential energy with the helium atom from the ground state to suitable quantized levels above the ground state. Since, in the case of helium, as has been pointed out before, this transition possibility only sets in at very elevated energy levels compared with the room-temperature kinetic energy of an electron in equilibrium. The electron gas in a typical ionization chamber will become very hot in the process of being collected by a sufficient electrical field, and will, therefore, manifest an exaggerated diffusion effect and time spreading of the pulse to an extreme degree. A molecule is no more able to absorb the energy of an electron ballistically than is an atom, but the molecule has a much larger group of closely spaced possibilities of inelastic collisions, which have their onset at very low bombardment energies for incident electrons, bombarding energies lying in the range of .04 electron volt, more or less, and closely spaced in the vicinity thereof. Therefore, a diatomic molecule, when present, will act as a means of absorbing the energy of "hot electrons" and dissipating this energy to the remaining portions of the gas. The diatomic and polyatomic molecules thus present may be required only in very small quantity, and are not altered or dissipated, but act in a capacity which we describe as catalytic, catalyzing, as it were, the effective transfer of energy back and forth between electrons and gas atoms or molecules, and promoting a prompt attainment of Maxwellian statistics, which are largely deviated from otherwise. The prompt attainment of Maxwellian statistics favors lower electron temperature, and accordingly, results in a minimizing of the undesirable random motions, and the production of quick pulses resulting from the collection of electron clusters caused by paths of recoiling atoms energized by neutrons. There is employed, in connection with the preferred method of well logging, and it is essential to some ways of practicing this discovery, a gaseous mixture containing, in addition to helium, an adequate trace of diatomic or polyatomic, but substantially nonelectron-capturing material, to bring about the above described energy transfer catalysis, and promote clean-cut quick registration of ionizing events occurring in the ionization chamber.

Figure 5:
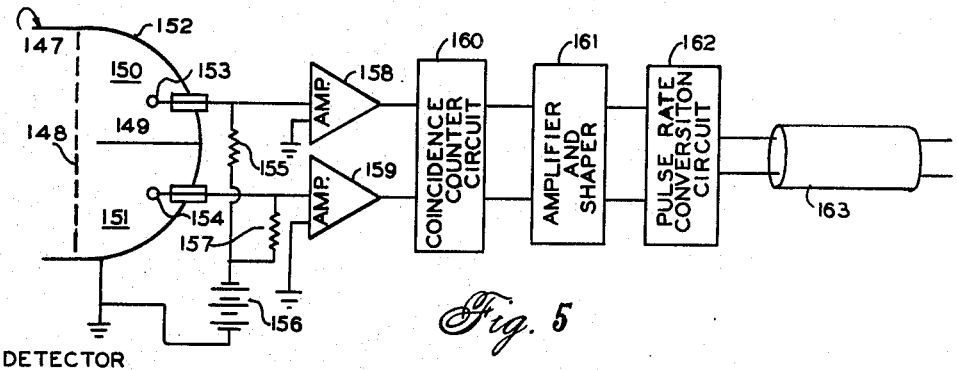
Figure 5 is a schematic diagram of a fast neutron detecting system having transverse directional sensitivity.

Another embodiment of the instant invention is shown diagrammatically in Figure 5. This embodiment makes it possible to determine horizontal sensitivities of processes attributable to fast neutrons, recoils occurring in a particular space in the detector. The recoils which are selected are those having a path that traverses the ionization chamber in a definite manner.

The ionization chamber 147 is of the general type described in connection with Figure 4. However it differs from that of Figure 4 in that the portion above the screen 148 is partitioned by an element 149 to divide that portion into two parts 150 and 151. The partition 149 depends from the top of the housing 152. However its bottom end does not necessarily contact the screen 148, in fact, under some conditions it may be completely omitted.

Each of the chambers 150 and 151 is provided with its collecting electrodes 153 and 154, respectively. These electrodes are elements in separate circuits. Electrode 153 is connected in a circuit including a resistance 155, a battery 156, and ground which is connected to the case of the ionization chamber. In a like manner, there is a circuit which includes resistance 157, battery 156, and ground. Potentials developed on the electrodes 153 and 154 are transmitted to amplifiers 158 and 159, respectively. The output circuits of these amplifiers are connected to a coincident circuit 160, indicated diagrammatically as a rectangle. Coincident signal pulses are delivered by the output of the coincident circuit to combination amplifier and pulse shaper 161. From this element, the shaped pulses are fed to a pulse rate conversion circuit 162, which in turn delivers a direct current, which varies in accordance with the time-rate of occurrence of the pulses introduced to it, to the cable 163. The signal transmitted to the surface is recorded in a conventional manner in correlation with depth.

In the operation of the above described device, dense ionizing paths are detected which cross the interior of the detector 147, in the region below screen 148, and cross the plane of the partition 149, extended. Because of the fact that recoils are directed generally forward, in relation to the movement of the neutron which produced them, this arrangement tends to be relatively more sensitive to incident neutrons which enter the detector perpendicularly to the plane of the element 149. This transverse sensitivity also applies in the sense that neutrons incident upon the detector will be relatively neglected if their travel is chiefly along the axis of the bore hole, and will be more emphasized if they travelled in such a manner as to enter the detector generally perpendicular to the bore hole. Such a preference is an advantage because it tends to emphasize deeply-penetrating neutrons, which have gone a long way out into the strata, from the source, before returning to the detector. Such deep penetration of the neutron flux, which is emphasized, tends to produce more representative observations of heterogeneous strata.

Figure 6:
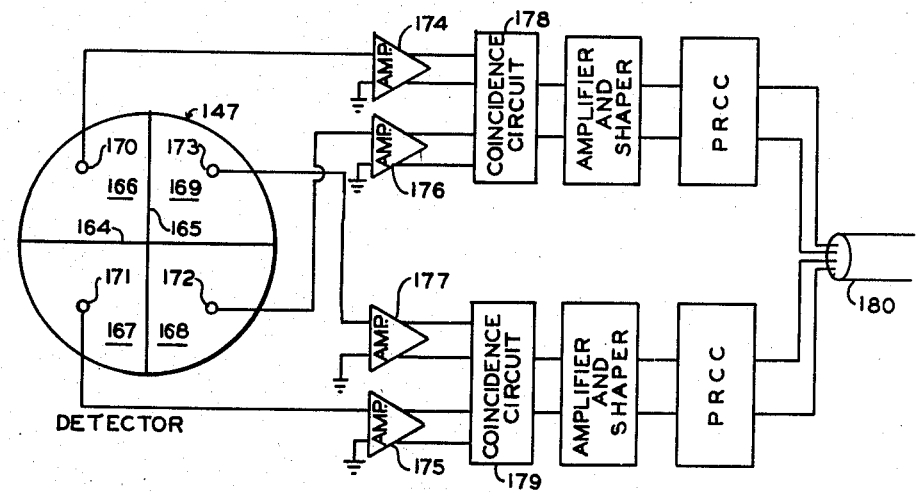
Figure 6 illustrates in cross-sectional view a modification of the detector shown in Figure 5.

In order to more clearly illustrate the manner in which horizontal sensitivities can be determined, reference is made to the modified form of detector shown in cross section in Figure 6. In this form partitions 164 and 165, which cross at right angles to each other, are shown instead of the single partition 149 described in connection with Figure 5.

Obviously the partitions 164 and 165 divide that portion of the detector above the screen 148, as illustrated in Figure 6, into four equal portions 166, 167, 168, and 169. The portions are provided respectively with collecting electrodes 170, 171, 172, and 173.

It is to be understood that each electrode is provided with the usual circuit consisting of a source of potential and a resistance. The output from each collector electrode is fed into a separate amplifier designated as 174, 175, 176 and 177, respectively. The outputs of the amplifiers, in pairs, are fed into coincidence counter circuits 178 and 179. The outputs of amplifiers 174 and 176 are fed into coincidence counter circuit 178 and the outputs from amplifiers 177 and 175 are fed into the coincidence counter circuit 179. The output signals from coincident counters circuits 178 and 179 are separately conducted through amplifier-shaper circuits and pulse rate conversion circuits to separate transmission circuits in the cable 180 by means of which they are conducted to separate conventional recording systems located on the surface of the earth. Under certain circumstances, the partitions 164 and 165 may be omitted.

In the modification of this invention shown in Figure 6, more useful directional sensitivity is possible because of its ability to compare effects in two mutually perpendicular directions. If, for example, there is a hole with considerable directional difference, several oriented passes would be necessary to determine the fact, by the device of Figure 5, but much less effort of this kind would be needed to determine transverse anisotropy of the strata in the case where the device of Figure 6 is used. Anisotropy can always be reliably determined by the device of Figure 6, if two such devices are concurrently used, mechanically coupled with their respective quadrants turned at 45°. The exact measurement of such anisotropy is obtained, in the case of the device of Figure 6, by subtracting the indications, delivered in the two coincidence channels containing circuits 179 and 178. In the case of the concurrent use of two Figure 6 apparatuses at 45° orientation, the same thing would be done to both of them and two differences obtained. A figure would then be calculated, which would represent a measure of the anisotropy $$(D_1^2 + D_2^2)^{1/2} = \delta$$

where $D_1$ is the difference obtained from one of the Figure 6 devices, $D_2$ is the difference obtained from the second such device, $\delta$ is the quantity which represents anisotropy. Obviously also, Figure 6 may be modified if desired to use octants instead of quadrants, pairing opposites and subtracting the pulse rate conversion circuit output of pairs of these which are 90° apart. The result thus accomplished is to supply the two differences which may be introduced into the above formula. Any such device or devices may be held in the middle of the bore hole and aligned axially therewith by means familiar in the art.

In both the device of Figure 5, and the device of Figure 6, an advantage is gained in making the directional properties more precise, if the coincidence circuits 160, 178, and 179 are made to be insensitive to any but large and concurrent pulses. Also, the same purpose can be accomplished by inserting between amplifiers 159 and 158 in Figure 5, and the coincidence circut 160 in that figure, and between amplifiers 174, 175, 176, and 177 and the corresponding coincidence circuits discriminator circuits for eliminating small pulses.

For the purpose of improving the directional sensitivity of the arrangements shown in Figures 5 and 6, masks composed of sheet metal may be superimposed in electrical contact with the screen 148 shown in Figure 5, and the screen, not shown, which is used in the same manner in connection with Figure 6. In lieu of such a mask, it will at times be convenient merely to close the holes in chosen areas of the screen. The open areas which exist where either of these modifications is employed will have a form and shape related to the direction measuring purpose for which the detector is used. For transverse sensitivity limited within a dihedral angle, the remaining open areas of the screen will be limited within the intersection of the planes of the dihedral angle and the screen. It is understood in the above that the line along which the planes composing the dihedral angle limits of sensitivity intersect is coincident with the axis of the instrument shown in Figure 5. Open sectors of 30 degrees will often be convenient. In the detector illustrated in Figure 4 one may use an open area lying between parallel chords of the screen disc, and distant one-fourth inch from the center of the disc. Two circular open areas may be employed in the case of the detector of Figure 5. These may be one-half inch in diameter, and with their centers lying on a diameter of the circular wire screen parallel to the line joining the tips of electrodes 153 and 154. In a preferred form, the above circular open areas will be tangent to the circular rim of the wire screen 148.

Figure 7:
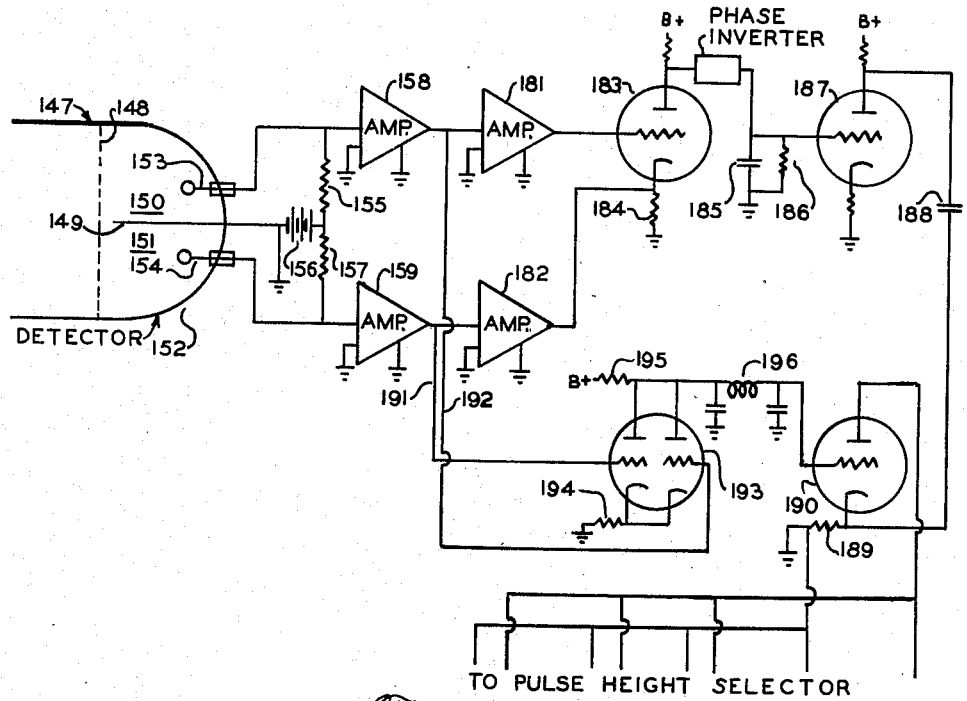
Figure 7 is a schematic diagram of a fast neutron detecting system having directional sensitivity and whereby pulses representing the energy of ionizing processes may be utilized.

In Figure 7 there is illustrated diagrammatically an electrical system by means of which the output from a detecting system, such as that illustrated in Figure 5, can be treated in such a manner as to give a more accurate measurement of direction of neutrons incident on the detector. In this figure the detecting system, up to and including amplifiers 158 and 159, corresponds to that shown in Figure 5 and carries the same reference characters.

The electrical system connected to the outputs of amplifiers 158 and 159 serves to measure through a coincident enabling circuit the added effect of coincident pulses produced upon electrodes 153 and 154 in the detecting system. The arrangement of apparatus for accomplishing this includes amplifiers 181 and 182 whose inputs are connected respectively to the outputs of amplifiers 158 and 159. These amplifiers include pulse height limiters so that output pulses are of uniform height.

The output of amplifier 182 is used to apply a bias potential to amplifier tube 183 by impressing a potential across the resistance 184 connected in the cathode circuit of the tube. The output of amplifier 181 is impressed directly upon the grid of tube 183. Tube 183 is normally biased beyond cutoff by an amount greater than the potential of one pulse alone, regardless of whether it is received on the cathode resistor from amplifier 182, or whether it is received on the grid of the tube 183 from the amplifier 181. Thus, tube 183 cannot conduct a pulse when non-coincident pulses are received from amplifiers 181 and 182. However, any coincident pulses received from the amplifiers 181 and 182 are, when totaled, sufficient to overcome the bias on tube 183 to produce a pulse in the plate circuit of this tube. The pulse so produced is impressed on a delay circuit which comprises a condenser 185 and a resistance 186 which are connected in parallel between the plate circuit of tube 183 and ground. Since the signal from tube 187 must enable the tube 190 during the whole interval of time in which the pulse is arriving from low pass filter 196 it is necessary that the pulse from tube be lengthened and that is the purpose of elements 185 and 186. The delayed signal is impressed on the grid of amplifier tube 187. Amplifier tube 187 is normally biased to a point sufficiently close to the upper cutoff, that a relatively wide pulse is delivered to the plate thereof. The pulse produced in the plate circuit of tube 187 is conducted through a condenser 188 to a resistance 189 which is connected in the cathode circuit of the tube 190 for the purpose of rendering this tube conductive.

By means of an auxiliary circuit, portions of signals delivered by the amplifiers 158 and 159 are diverted through conductors 191 and 192 to separate grids of a dual triode amplifier tube 193. The two triodes of the tube 193 have the same properties. The cathodes of tube 193 are connected together and to ground through a resistance 194. The plates of this tube are connected together and to a source of plate potential through a resistance 195. With such an arrangement of tube elements, coincident pulses on the grids of tube 193 are added together to produce a single pulse signal in the plate circuit of the tube representing the sum of two pulses. This signal is conducted through a low-pass filter 196 to the grid of amplifier tube 190 to produce a signal in the plate circuit when the tube is rendered conductive by the enabling circuit which impressed the bias potential from amplifier tube 187 on the resistance 189. The signal output from tube 190 is applied to a pulse height analyzer one channel of which may be as illustrated in Figure 16 of our copending application Serial No. 107,806. The outputs from the plurality of channels of this pulse height analyzer may be recorded or respectively fed into pulse rate conversion circuits connected in the manner described in connection with Figure 13 of our copending application Serial No. 107,806. The output signals from the pulse rate conversion circuits are combined and transmitted through conductors in the cable to a recording system located on the surface of the earth adjacent the mouth of the drill hole where they are recorded in correlation with depth.

The device illustrated in Figure 7 enables the operator to accomplish concurrently a measurement of the relative excess or deficinecy of a particular energy group of neutrons, and a better determination of the direction of the neutrons of which there is an excess or deficiency with respect to neighboring energy groups. The square hit recognition property of Figure 7, limits the detecting system to observing recoils which are substantially collinear with the neutrons which set them in motion, and which therefore have a direction which may be used to measure the direction of the incident neutrons.

The need for class recognition, such as is provided in Figure 7, arises because it is impossible, in general, to provide for a wide variety of specified maximum energies in a bore hole. Without the arrangement of Figure 7, attention of directionally sensitive processes involving square hit recognition would be severely limited as to the energies of neutrons at which such processes can be carried out, limited in fact to approximately 2.5, 12 and 14 m.e.v. It is desirable to study the general range of energies, because only so can one detect specific elements by their nuclear resonances, as has been taught elsewhere in this application. The apparatus of Figure 7 thus provides for an essentially new and valuable result, to wit, the directional recognition of specific elements by their specific interaction with neutrons.

Figure 8:
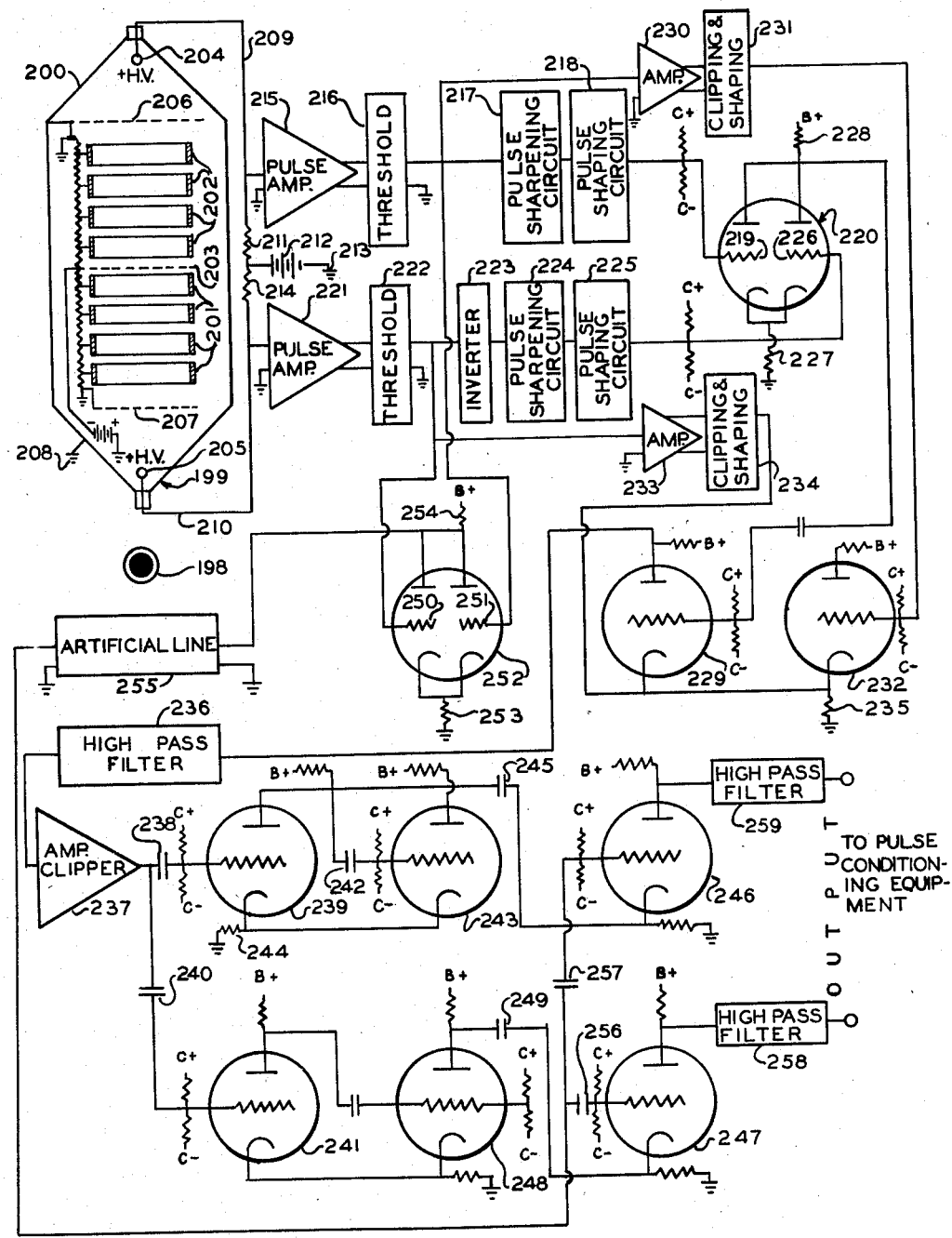
Figure 8 is a schematic diagram of another embodiment of fast neutron detecting systems in which there are neutron directional sensitivity, sense of direction sensitivity, and energy sensitivity.

Another embodiment of the instant invention is illustrated in Figure 8. This embodiment lends itself to the measurment of the direction and sense of direction taken by an ionizing particle in a detector, as well as the energy of the incident neutron.

In this figure there is shown a novel detector 199 and a source of neutrons 198 located below the detector 199. It is to be understood that all the apparatus of Figure 8 is to be assembled within a housing that is adapted to traverse the bore hole.

Detector 199 consists of a housing 200 which encloses an ionizable medium such as a mixture of hydrogen and helium, but predominantly one or the other, under a pressure of from 10 to 500 atmospheres dependent upon the dimensions of the detector, and the voltage applied thereto. Inside the detector, and disposed in the ionizable mixture, are a plurality of ring shaped electrodes. These are divided into two groups 201 and 202 by a screen 203. The ring electrodes are vertically spaced from each other by substantially uniform intervals of distance. Also disposed in the detector in such a manner that they extend inwardly a short distance from each end, are electrodes 204 and 205. The region about electrode 204 is divided from the region of the ring electrodes 202 by a screen 206. In like manner the screen 207 divides that portion of the ionization chamber immediately surrounding the electrode 205 from the region of the rings 201. The housing 200 of the detector is ground at 208. Conductors 209 and 210 make connections respectively between the electrodes 204 and 205, and external circuit elements to be described.

Conductor 209 forms, with resistance 211, battery 212, and ground 213, an electrode circuit for the top electrode 204. In the same manner conductor 210 forms, with resistance 214, battery 212, and ground 213, an electrode circuit for the bottom electrode 205.

Signals produced across the resistance 211 are amplified by the pulse amplifier 215, and fed to a threshold circuit 216. Threshold circuit 216 serves to block small signals such as those that are produced by the dissipation of gamma rays.

Any signals that extend over the threshold for which circuit 216 is adjusted are allowed to pass and be conducted to a pulse sharpening circuit 217, which may be a differentiator. The signal output from 217 is introduced into a pulse shaping circuit 218 which consists of means for lengthening the pulses with respect to time but not changing their height. The pulses so shaped are then impressed upon the grid 219 of a double triode amplifier tube 220, for a purpose to be described later.

Signals produced across the resistance 214 are amplified by the pulse amplifier 221, and fed into a threshold circuit 222. Threshold circuit 222 functions in the same manner as that described in connection with threshold circuit 216. Signals from the threshold circuit 222 are fed into an inverting circuit 223. After inversion the signals are conducted to a pulse sharpening circuit 224, which may be a differentiating circuit. The sharpened pulses are then fed into a pulse shaping circuit 225 which lengthens the pulses with respect to time but does not increase or decrease their height. The shaped pulses are then impressed upon the grid 226 of the amplifier tube 220. It is to be understood that both halves of the double triode will have similar properties. Obviously, tube 220 can be replaced by two triodes having matched characteristics. The cathodes of the double triode 220 are connected together, and through resistance 227 to ground. The plates of this tube are connected together to form a single output circuit. Plate potentials are supplied to both plates through the resistance 228.

Both halves of tube 220 are biased to a point which is at substantially the center of their linear amplifying range. Any signal flowing in the plate circuit from tube 220 will be representative of the difference between signals impressed upon grids 219 and 226. The polarity of this signal will determine which of the grids had the greater potential impressed upon it by their circuits described immediately above. The difference between the potentials applied to the grids 219 and 226 will determine the direction and sense of direction of ionizing particles passing through both halves of the ionization chamber within the range of the electrodes.

The density of ionization occurring along the path of a heavy-particle recoil in an ionizable medium is non-uniform and is much greater near the end of the path. Hence, if an arrangement of apparatus is provided for measuring the ionization of the early and late part of the path separately, obviously, the ionization appreciated from the late part of the path will be greater than that from the early part of the path. If the ionizable medium is a gas which does not attach electrons and which has a means provided for maintaining the free electrons at a relatively low temperature, it is possible to collect the free electrons occurring along the heavy-particle path sufficiently quickly that their time arrival at the collector electrode will be a faithful representation of their time of liberation. An exception to this is a particle path which lies along an equipotential plane in the detector. These paths, however, are ignored in the apparatus here described. The collection of electrons from the late part of the path will not only contain more total energy but will also be characterized by a higher rate of arrival of energy at the electrode than from the early part of the path.

The detector 199 shown in Figure 8 makes possible the results stated above. Particle paths arising in the space enclosed by ring electrodes 201 and ending in the space enclosed by ring electrodes 202 will then cause a positive pulse in the plate circuit of tube 220 and if the beginning and end were reversed with respect to these two spaces the pulse appearing in the plate circuit of tube 220 will then be negative.

The output signal from tube 220, regardless of its polarity, is impressed upon the grid of an amplifier tube 229. The function of this signal will be described in connection with the auxiliary circuits, a description of which will follow.

A portion of the signals passing through the threshold circuit 216 are diverted to an auxiliary circuit which includes an amplifier 230 and a clipping and shaping circuit 231. The output pulses from circuit 231 will then be conducted to and impressed upon the grid of tube 232. In operation this tube functions jointly with the auxiliary circuit which conducts a portion of the signals diverted from the output of the threshold circuit 222 to an amplifier 233. The output of amplifier 233 is fed into a clipping and shaping circuit 234 from which it is conducted to the cathode circuit of tubes 229 and 232 and there impressed across the resistor 235.

Tube 232 is normally conductive. Tube 229 is normally biased to a point beyond cutoff, by means of the normal potential on resistance 235 due to the condition of the circuit through tube 232 and to the bias placed on the grid of tube 229. However, when the potential supplied by the clipping and shaping circuit 234 is applied across the resistor 235, and a pulse impressed from the clipping and shaping circuit 231 is applied simultaneously on the grid of tube 232, then the signal from tube 220 which is impressed on the grid of tube 229 causes a pulse of current to flow in the plate circuit of tube 229. This is true because tube 229 has been rendered conductive by the simultaneous arrival of pulses from circuits 231 and 234. These output pulses will have individual polarity determined by the polarity of the pulses from tube 220. The enabling pulses impressed across the resistance 235 and on the grid of tube 232 are of lower frequency than the signals received on the grid of tube 229. This situation is made to exist in order that separation of the desired signals can be made from the enabling pulses by means of a suitable high-pass filter 236. The pulses flowing from the high-pass filter 236 are amplified and clipped by the amplifier 237. The pulses flowing from amplifier 237 may be either positive or negative in polarity depending upon the output pulses from the tube 220. Pulses of positive polarity will flow through the condenser 238 to the grid of tube 239, while negative pulses will flow through the condenser 240 to the grid of tube 241. This is made possible by maintaining tube 239 in a normally cutoff condition and tube 241 in a normally conducting condition such that tube 239 will pass only signals which are positive in polarity and tube 241 will pass only signals which are negative in polarity.

When a positive signal is impressed upon the grid of tube 239 the tube tends to become conductive and negative pulses are produced on the plate of tube 239. These negative pulses are conducted through condenser 242 to the grid of tube 243. This tube is normally conductive. This negative pulse causes a drop in the plate current of tube 243, resulting in a tendency to produce a drop in potential across resistor 244. Resistor 244 is a common cathode resistor for both tubes 239 and 243. This reduced potential across resistor 244 causes the plate current in tube 239 to increase still further. This, of course, causes a further negative signal on the plate of tube 239. This positive feed-back arrangement continues to operate until tube 239 reaches saturation and tube 243 becomes nonconductive. When a portion of the charge in the condenser 242 leaks off through the bias resistors, the circuit is rapidly restored to normal by the positive feed-back just described. The pulse produced by the circuit at the plate of tube 239 is a relatively low frequency pulse which is conducted through condenser 245 to the cathode of tube 246. Tube 246 is normally biased beyond cutoff, but this negative pulse impressed upon the cathode, causes the tube to become conductive. The tube now can receive signals on the grid and faithfully amplify them. A manner in which signals impressed upon the grid of this tube are produced and the function that they serve will be described later.

As pointed out above, pulses from the amplifier 237 are delivered to the tube 241. Tubes 241 and 248 operated in the manner described in connection with tubes 239 and tubes 243. The only difference is that tubes 241 and 248 are triggered by negative pulses whereas tubes 239 and 243 are triggered by positive pulses. The pulses produced in the plate circuit of tube 248 are conducted through a condenser 249 to the cathode of tube 247. Tube 247 in the same manner as described in connection with tube 246, is normally biased beyond cutoff and the signal impressed upon the cathode resistor serves to condition the tube for the reception of a signal on its grid. Tube 246 or 247 will function to produce a pulse in their plate circuits, dependent upon the polarity of the signal produced by tube 220. The signal that is desired to be represented in the plate circuit of either tube 246 or 247 is a pulse which will represent the total energy of the ionizing process which occurs in the detector. To accomplish this, a portion of the signal from the threshold circuit 216 and a portion of the signals from the threshold circuit at 222 are respectively impressed upon the grids 250 and 251 of the dual triode 252. It is to be understood that both halves of this tube will have similar properties, or this tube may be replaced by two independent triodes having similar properties. The cathodes of this tube are connected together and to ground through resistance 253. The plates are connected together and to a source of potential through a resistance 254. A coincident pulse delivered by the threshold circuits 216 and 222 when impressed upon the grids of tube 252 will add together to produce a signal in the plate circuit of this tube which is proportional to the sum of the amplitudes of the coincident pulses. The signal is conducted through an artificial line 255 which has as its purpose to delay the signal a specified length of time. The delayed signal is then conducted to the grids of tubes 246 and 247 through condensers 256 and 257. This signal represents the energy of the incident particle. This signal is impressed upon the grids of both tubes 246 and 247 and will be conducted through only one tube, dependent upon which tube has received an enabling pulse on its cathode. The tube which receives the enabling pulse depends upon the polarity of the signal from tube 220 and hence upon the direction and sense of direction of the path of the ionizing particle in the detector.

Pulses flowing in the plate circuit of tubes 246 and 247 are conducted through high-pass filters 258 and 259, respectively. The outputs from these filters are conducted through separate circuits to recorders where separate records may be made in correlation with depth.

The apparatus shown in Figure 8 represents a novel and valuable way of practicing the instant invention. The new element of information which has been added is the sense of direction of neutrons. Heretofore, the directional means which have been disclosed offer no opportunity to determine this fact, offering only the possibility of knowing that a particle took one of two opposite courses.

This desirable result enables the operator to select neutron particles entering with a component in the direction opposed to the sense which a particle would have if it travelled on the direct line of travel from the source. By selecting incident neutrons which are so directed and which have high energy, one is able to measure that portion of the flux of neutrons derived from the source which has penetrated very deeply through the strata, and is therefore adapted to give a valuable improvement of accuracy in the measurement of very heterogeneous strata.

Figure 9:
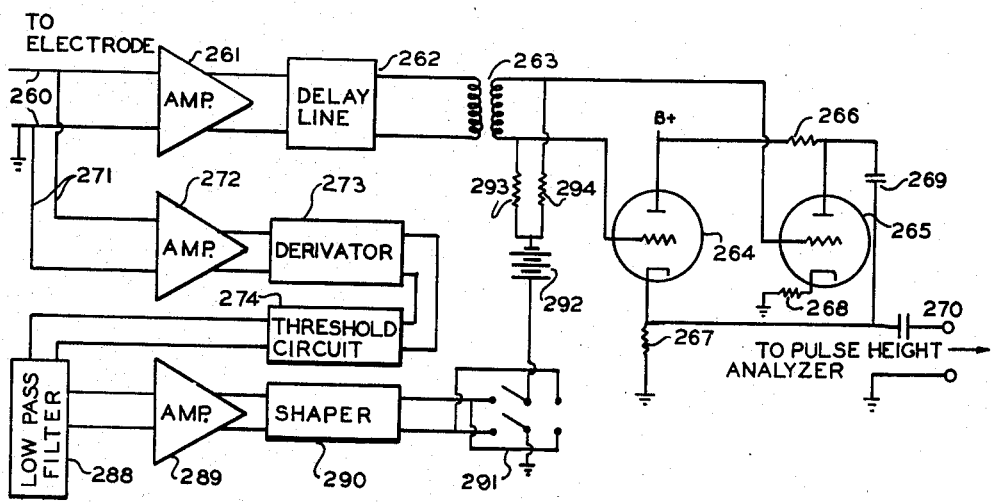
Figure 9 illustrates schematically a further embodiment of a detecting system in which direction, sense of direction, and energy of fast neutrons are detected.

A modified electrical system for determining direction, sense of direction, and energy of the particle producing a process within the detector, is illustrated in Figure 9. Conductors 260 lead from a detector, not shown, such as that illustrated in Figure 4. The top one makes connection with electrode 27 and the bottom one makes connection with the case or ground.

It is to be understood that the detector will be provided with the conventional electrode circuit which includes a resistance and high potential source. Pulses from the detector are conducted to the amplifier 261 where they are amplified and delivered to a delay line 262. The pulses passing through the delay line 262 are transformed by the radio frequency transformer 263 and impressed upon the grids of tubes 264 and 265 in the manner shown. The plate of tube 264 is connected to a source of potential indicated as B+. The plate of tube 265 is connected to the same source of potential through a resistor 266. The cathode of tube 264 is connected to ground through a resistor 267. The cathode of 265 is connected to ground through the resistor 268. The cathode of 264 is connected to the plate of tube 265 through condenser 269 and a lead is brought out to the condenser 270. Condenser 270 may be connected to a pulse height discriminator circuit or to a plurality of such circuits.

Figure 10:
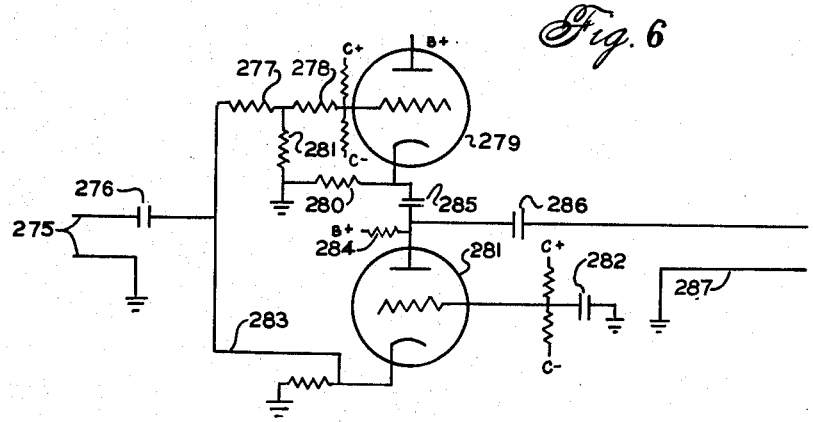
Figure 10 is a wiring diagram illustrating the threshold circuit shown schematically in the bottom portion of Figure 9.

A portion of the signals conducted from the detector are diverted through an auxiliary circuit. Conductors 271 conduct the diverted portion to amplifier 272 where they are amplified and are delivered to the derivating circuit 273. The derivated signals are then introduced into threshold circuit 274. The threshold circuit 274 takes the form shown in Figure 10. In Figure 10 the input of the derivating circuit comprises the conductors 275, by means of which the signals are conducted through a condenser 276 and resistances 277 and 278 to the grid of a tube 279. The plate of tube 279 is connected to a source of potential indicated by B+. The cathode of this tube is connected to ground through a resistance 280. A resistance 281 having one end connected to ground, has its other end connected at a point between resistance 277 and 278. Tube 279 is followed by a tube 281. The grid of 281 is grounded for radio frequency through condenser 282. The cathode of tube 281 is connected to the input end of the resistor 277. The plate of tube 281 is connected to a source of potential through a resistor 284. This plate is also connected to the cathode of tube 279 through the condenser 285. The output of this circuit is transmitted through the condenser 286 and ground terminal 287 is the other output terminal. The threshold circuit shown in Figure 10 passes positive pulses greater than a certain magnitude through tube 279 and negative pulses greater than a certain magnitude through tube 281.

Again referring to Figure 9 the output signal from the threshold circuit illustrated in Figure 10 is fed through low-pass filter 288 to the amplifier 289. The amplified signal is then introduced into the shaping circuit 290. After the signal has been shaped in circuit 290 it is fed through a double pole, double throw switch 291, to the secondary circuit of radio frequency transformer 263, passes through the battery 292 and is then divided. A portion of the signal flows through the resistance 293 and the remaining portion flows through the resistor 294. The signal fed through the resistances 293 and 294 does not appear in the output of this system when there is no signal coming through the radio frequency transformer from the delay line 262. Likewise the signal transmitted through the radio frequency transformer 263 does not appear in the output terminal leading from condenser 270 when there is no signal transmitted by resistances 293 and 294. When a sufficient signal is transmitted through the resistances 293 and 294, uniformly shaped in element 290, and when concurrently there arrives a signal commencing after the beginning of the shaped signal and ending before the conclustion of the shaped signal which is the other signal coming through the radio frequency transformer 263, then a signal will appear at the terminal of condenser 270 and it will faithfully represent the signal transmitted through the radio frequency transformer 263.

In operation, signals transmitted through the upper portion of the circuit, which includes the amplifier, delay line, and radio frequency transformer 263, will be impressed upon the grids of tubes 264 and 265. These tubes will conduct pulses to the output circuit only when they have been enabled by a signal which has been conditioned in the lower circuit, and delivered to the grids of these tubes, as previously described, through the resistors 293 and 294. The enabling circuit is provided for the purpose of causing transmission to the output, of a particular class of information and excluding unwanted classes of information.

The type of classification which is accomplished by the enabling or lower circuit of Figure 9, has as its purpose, as has been previously stated, the recognition of direction and sense of direction of particles which cause the ionizing paths in the detector to which the circuits of Figure 9 are connected. The classification of processes which is accomplished by the aid of the lower circuit of Figure 9 is made possible by the fact that the electrical signals which occur in the radiation detector connected to the input of this system are different for different direction, and sense of direction of the particles which cause the ionizing paths in the aforesaid detector. The case which is most useful for the employment of the classification processes accomplished by the lower circuit of Figure 9, is that in which the ionizing process occurring in the circuit of electrode 27, was caused by an ionizing path generated by a particle in the radiation detector, which moved in a direction having a substantial component parallel to the axis of the detector.

Figure 11:
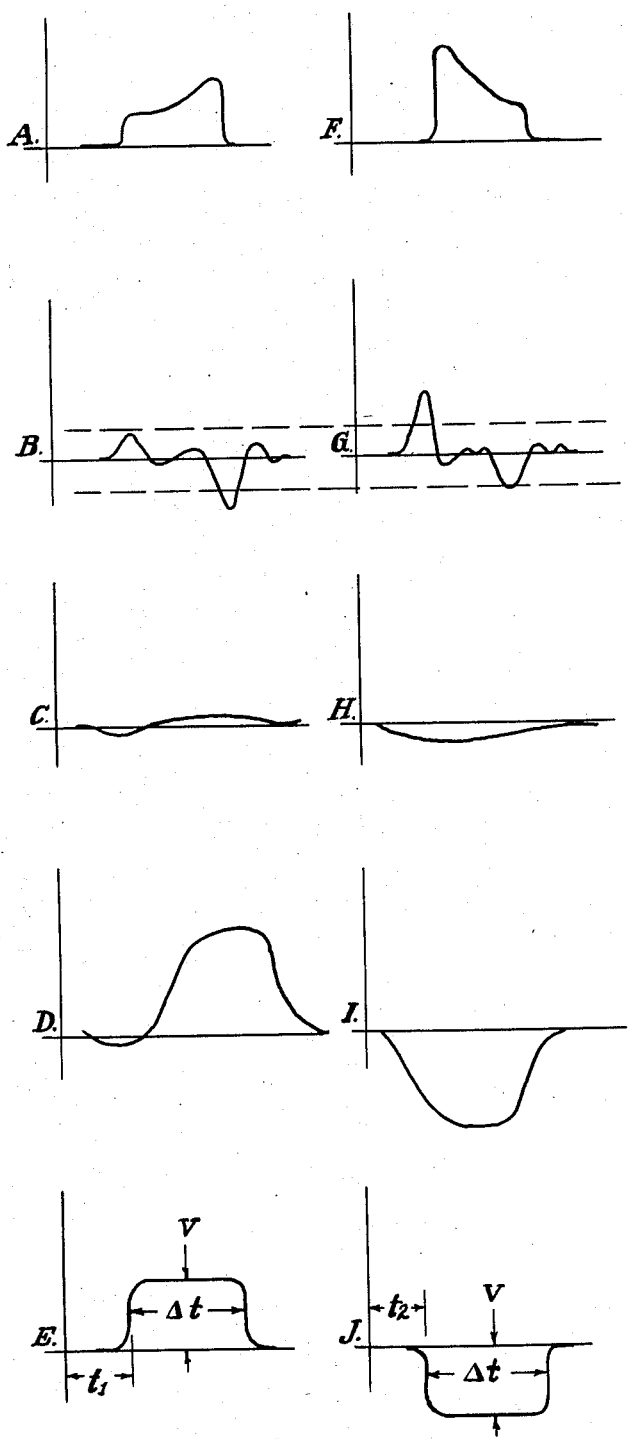
Figure 11 shows a system of graphs which illustrate the behavior of the circuit of Figure 10.

For the above class of processes, corresponding with incident neutrons directed generally along the axis of the detector either upwardly or downwardly, there are two kinds of electrical signals which appear on the electrode 27. For neutrons moving along the axis, and moving downward, the resulting recoil atoms generally produce at the electrode 27 signals like that represented in Figure 11A. For neutrons incident upwardly upon the detector of radiation, the resulting recoils generally produce electrical signals on the electrode 27 like that illustrated in Figure 11F. The signal illustrated in Figure 11A takes the form shown in Figure 11B after passing through the derivator circuit 273. The derivated signal is then passed through the theshold circuit 274. This signal in turn is passed through the low-pass filter 288 to produce the signal shown in Figure 11C. This signal represents an approximation to the negative integral of that part of the signal illustrated in Figure 11B outside the threshold range. The amplifier 289 produces from the signal of Figure 11C the signal shown in Figure 11D. The shaper 290 produces from this impulse a signal not crossing the zero axis of voltage such as that shown in Figure 11E. This signal commences at a time $t_1$ and ends at a fixed time thereafter, corresponding with a positive voltage slightly greater than the sum of the voltage of battery 292 and the normal operating bias of tubes 264 and 265. The signals corresponding with a recoil caused by a neutron incident upwardly along the axis of the detector of fast neutrons are similarly transformed, and result in a similar flat-topped signal 11J, but of opposite polarity. The polarity which occurs in diagrams 11E and 11J is, in each case, brought about by the fact that the integral of the high peaks of the derivator output has opposite polarity. The transient which occurs between these peaks, and after them, which would otherwise cancel the value of integral, is eliminated through the action of the threshold circuit 271. Circuit 271 acts to ignore the portion of the derivator output between the dotted lines in diagrams of Figures 11B and 11G. The action of the lower circuit of Figure 9 will enable the passage of pulses through the upper circuit, only in those instances where the pulses generally have the form of Figure 11A if the inversion switch 291 is in the left hand position. If the inversion switch 291 is in the right hand position, the enabling circuit will then transmit signals only when the pulses received from the electrode 27 have the form shown in Figure 11F. The waves shown in diagrams E and J of Figure 11 differ in that they will have different times of onset by an amount which is of the order of the duration of the pulses shown in Figures 11A and 11F. To overcome the difficulty caused by this inequality of times of onset of waves illustrated in Figures 11E and 11J, $\Delta t$ shown in the figure is made two or three times longer than the duration of time in which the pulses shown in Figures 11A and 11F exist. The delay introduced by the delay line 262 is made sufficient to cause a pulse traveling along the upper circuit of Figure 9 to the radio frequency transformer 263, to arrive just after the time of commencement of the enabling pulse shown in Figure 11E, which is the last arriving of the two possibilities. The pulses transmitted in the upper circuit will be faithfully represented and transmitted to the output terminal of condenser 270, because of the chosen smooth top of the enabling pulse, and because of the fact that it is made to offer an equal voltage which does not vary through the time that the upper circuit is enabled. The enabling pulse therefore renders the tubes 264 and 265 continuously and equally conductive during the enabling interval, which includes the time of arrival of the desired event from the radio frequency transformer 263, regardless of whether it is an event corresponding with Figure 11A, downwardly incident neutron, or an event corresponding to Figure 11F, upwardly incident neutron, selected by suitable setting of switch 291.

Figure 12:
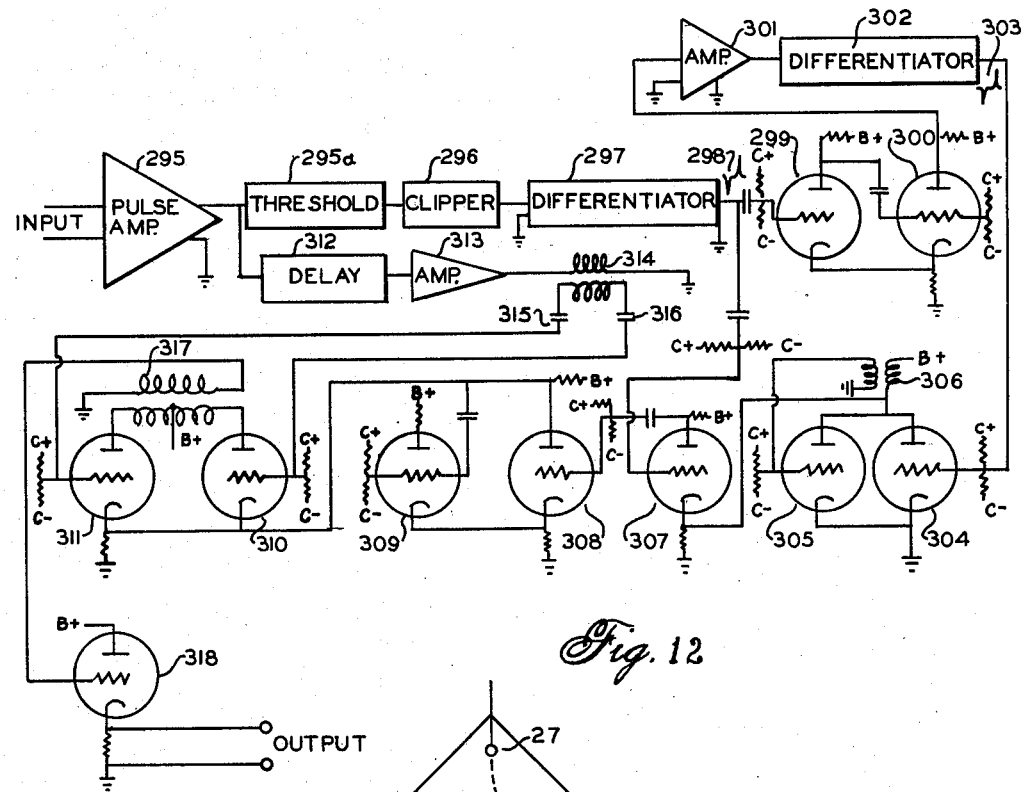
Figure 12 is a schematic diagram of an electrical system for pulse duration selection.

In Figure 12 there is illustrated an electrical system that is adapted to be employed with certain apparatus or combinations of apparatus shown in the preceding figures of drawings for the purpose of discriminating between pulses on the basis of time duration and faithfully amplifying and recording the pulses having a specified time duration in correlation with depth.

Pulses from a detector, such as that shown in Figure 4 are amplified by the amplifier 295 and introduced into a threshold circuit 295a and clipper circuit 296. The clipped pulses are then differentiated by the differentiator circuit 297. The action of the differentiator is to produce a signal such as that illustrated at 298, that is, one having negative and positive pips. The circuit built around tubes 299 and 300 will be recognized as a trigger circuit, which is triggered by the leading pip of the signal shown at 298 to produce a pulse of specified height and duration. The duration of this pulse is determined by the lower limit of the range of pulse duration selection desired. The pulse produced by the pulse generating circuit is amplified by an amplifier 301 and then differentiated by differentiator 302 to produce a signal such as is illustrated at 303. It is to be noted that this signal is composed of a negative pip followed by a positive pip. The positive or trailing pip triggers a blocking oscillator circuit which includes the tubes 304 and 305, connected in the manner shown, and the transformer 306. The blocking oscillator when triggered, produces a narrow pulse which is used as an enabling pulse in the cathode circuit of tube 307. The width of this pulse determines the range of pulse duration selection. Tube 307 is normally biased to cutoff and the enabling pulse conditions it to become conductive when a signal of proper polarity is impressed on its grid. If a signal corresponding to that illustrated at 298 occurs while the tube 307 is enabled, the positive pip thereof, when impressed on the grid of tube 307, will cause a pulse to be produced in the plate circuit thereof. This pulse will be impressed on the grid of a tube 308 which will, with tube 309 and the associated elements, form a triggered pulse generating circuit. When triggered by a pulse from tube 307 this circuit will produce a pulse having specified height and duration. This pulse is impressed across the resistance connected in the cathode circuit of tubes 310 and 311 and serves to enable or condition these tubes for conduction when signals are impressed on their grids.

A portion of the output signals from amplifier 295 is diverted through a delay circuit 312 and amplifier 313 to the transformer 314. The signal from transformer 314 is conducted through condensers 315 and 316 to the grids of tubes 310 and 311. Tubes 310 and 311 are normally biased beyond cutoff. The pulse from tube 308 is negative in sense and just sufficient in height to cause a fall in potential of their cathodes such that the tubes 310 and 311 will be in the middle of their conducting range. The duration of this pulse is sufficient to maintain the tubes in a conducting state until the pulse arriving from transformer 314 is finished. The output of tubes 310 and 311 is taken from the push-pull plate-to-plate high frequency transformer 317. This output signal is a faithfully amplified representation of the pulse arriving from transformer 314, and because of the push-pull connection, contains none of the enabling pulse impressed on the cathodes of these tubes. The output of transformer 317 is impressed upon the tube 318 which is operated as a cathode follower and hence the output of this tube is taken between the cathode and ground. The output of this circuit may be fed into a pulse rate conversion circuit and conditioned for recording in correlation with depth of the drill hole in the manner taught in an earlier part of this specification.

The uses of the device of Figure 12 are very numerous in neutron well logging. Among other things, the device of Figure 12 enables the operator to concurrently determine the energy and direction of neutrons incident upon the detector. If the devices previously described are suitably combined with the device of Figure 12, the operator may determine concurrently the energy, direction, and sense of direction of neutrons incident upon the fast neutron detector. Direction, as used above, means simply the angle of incidence of the neutron upon the detector with respect to the axis of the detector. Geographic sense of direction may be added, when desired, by superimposing on the pulse selection described in connection with Figure 12, selection like that described in connection with Figures 5 and 6 which gives geographic direction selectivity.

By use of the device of Figure 12 it is also possible to accomplish a classification of the types of ionizing tracks occurring in the chamber of Figure 4, according to the types of ionizing particles which cause these tracks. How all these purposes are accomplished will become clearer from a consideraiton of Figure 13.

Figure 13:
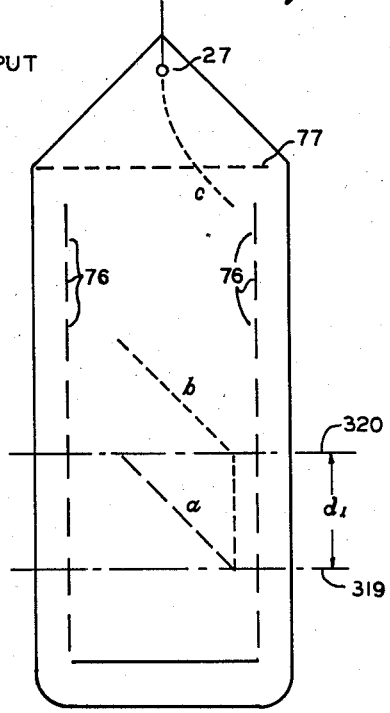
Figure 13 is a diagrammatic illustration of a detector, similar to that in Figure 4, in which is shown the geometric interpretation of the application of the circuit shown in Figure 12.

In Figure 13 there is illustrated at $a$ a path of a heavy ionizing particle, such as a recoiling helium atom. Because the space inside the detector rings 76 is occupied by a uniform and straight electric field, so polarized as to draw the electrons upward, the row of electrons released by the recoil may be thought of as being uniformly translated upwardly at high speed, but relatively undistorted after being formed. For purpose of illustration, there is shown at $b$ the location of the row of electrons at time $t_1$ after it was formed at $a$, and at $c$, the position of the row at a still later time $t_2$. Because of the concentrated nature of the electric field around electrode 27, electrons are appreciated at a constant short interval of time after they pass through the screen 77 independently of where they enter it. The electrical pulse generated on electrode 27 will, therefore, substantially faithfully represent the rate at which the electrons passed through the screen, during an interval of time in which a path defined by electrons arrives in front of the screen in a position to pass through it. Because of the uniform nature of the translation of the electron paths and the uniform manner in which they pass through the screen and are effective on electrode 27, a given duration of electrical pulse $\Delta t$ will always characterize ionizing paths occurring in the detector. Such a path could be thought of as beginning and ending on any two parallel planes 319 and 320 which are perpendicular to the electrical field in the detector, provided these planes are separated by a distance $d_1$.

When using a detecting system such as that illustrated in Figure 13 it is desirable to defininitely limit the class of directions of recoil paths caused by recoils of a specific energy group whch are detected. Such a definite limitation is achieved by superimposing on the signals received from a detector, such as is illustrated in Figures 4 and 13, two selecting processes. These selecting processes are accomplished by connecting to the output of the detector a circuit of the type shown in Figure 12. In such a case the recoils, which result in electrical pulses benig appreciated in the recording circuit, will correspond with paths in the detector which had a fixed angle with direction of the axis of the detector. The above selection processes fix this angle because they amount to a measurement of the total length of the particle path plus a measurement of its component parallel to the axis. Since the amount of ionization may be made determinative of the path length and the pulse height is proportional to the total amount of ionization then the pulse height must necessarily be a monotone increasing function of path length. For a given particle, and in a given atmosphere there will be a uniquely determined particle path length corresponding with each energy. Likewise the component of the recoil particle path parallel to the axis is known, being determined by the selection of $\Delta t$ and interplanar distance $d_1$ in the circuit of the type shown in Figure 12.

The selection angle determined, as explained, is calculated from the equation $$\theta = \cos^{-1} \frac{d_1}{h}$$

where
$\theta$ is the angle between the direction of a recoil path and the direction of the axis of the detector;
$d_1$ is the interplanar distance shown in Figure 13; and
$h$ is the ionizing particle's path length, determinable from the pulse height.

The point proportional counter, familiar in the art, and the straight field ionization chamber, also well known, have been combined to produce the apparatus shown in Figure 4. The combination is accomplished by the provision of the screen 77, which takes the place of a collector electrode in the straight field chamber, and takes the place of part of the wall of the proportional counter. By placing the open part of the screen at a region of maximum and constant sensitivity, and designing it as an electrostatic shield, the combined detector becomes a proportional electron impulse ionization chamber as well as a proportional counter. Because of the larger volume of the straight field space below screen 77 for collection, much greater sensitivity is secured than is available in point counters. Also, as has been pointed out, the arrangement of Figure 4 enables the faithful electrical representation of successive portions of an electron track caused by a particle path, and in the order in which the successive portions collected were initially nearest to the screen 77. Other uses and advantages of the device shown in Figure 4 will, with the above teaching, occur to those skilled in the art.

A novel electrical impulse detector which employs ring electrodes to shape a portion of the electric field within it is also described. The description also sets forth a system of analyzing the recoils caused by neutrons to determine the energies of the neutrons that caused them as an indication of the presence of specific elements. This last described system is also disclosed as applied to a well logging operation. Alternative systems for those enumerated above are also described. A group of detectors responsive to specific elements at defined directions from the wall of the bore hole are disclosed, some being responsive to hydrogen only, and others being responsive to any desired chemical element. Selected detectors of this group are capable of being used for deep and accurate investigation of very thin strata. The presence of specific elements in the formations can be determined by a system described above which enables the ascertainment of the kind of particle which produced ionization in a detector of fast neutrons, the length of ionizing path and the energy expended in producing the path.

It is to be understood that this invention finds specific application to well logging in that it affords means and apparatus whereby petroleum and other valuable substances can positively be located in situ. It has general application to the measurement of the influence of the nuclear parameters of various chemical elements upon a flux of fast neutrons.

We claim:
1. A method of detecting radiation that comprises subjecting a first region of a confined ionizable medium to said radiation, translating the electrons thereby produced with substantially no further ionization through said first region into a second region of said medium, accelerating said electrons in said second region to produce further ionization and thereby multiply the number of electrons, collecting said multiplied electrons, and measuring the resultant electrical pulses as indicative of the incident radiation.

2. A method of detecting radiation that comprises subjecting a first region of a confined ionizable gas to said radiation, translating as a group the electrons thereby produced with substantially no further ionization through said first region into a second region of said gas, accelerating said electrons in said second region to multiply electrons by gas amplification, collecting said multiplied electrons, and measuring a characteristic of the resultant electrical pulses as indicative of a quality of the incident radiation.

3. A method of measuring a flux of fast neutrons which comprises producing with the said neutrons recoil particles of the atomic nuclei of a detection medium, deriving from successive parts of the paths of the said recoil particles in said medium different electrical signals, and electrically combining said signals to indicate the direction of travel of the said recoils and hence of the neutrons which caused them.

4. A method of detecting fast neutrons that comprises producing with said neutrons recoil particles of the atomic nuclei of a confined ionizable medium divided into at least two regions, said recoil particles thereupon producing a path of electrons in said ionizable medium; separately collecting the electrons produced in each of said regions, thereby forming electrical pulses; and measuring the pulses coincidently collected in at least two of said regions as a measure of the occurrence of recoil particles having paths partly in at least two regions and hence a measure of the occurrence of neutrons incident upon the detector in directions corresponding generally with the directions of the said recoil paths.

5. A method of detecting fast neutrons that comprises subjecting an ionizable medium to the neutrons, producing electrons in paths defined by recoil particles produced by said neutrons in said medium, translating with substantially no further ionization the electrons defining said paths through a uniform electric field into a region of non-uniform electric field, said non-uniform electric field accelerating the electrons in paths leading to a point of collection, and collecting the electrons thus producing electric pulses.

6. A method of detecting radiation that comprises subjecting an ionizable medium to said radiation, separately collecting the electrons thereby produced in each of two regions of said ionizable medium, deriving electrical pulses from electron collection in both regions coincidently as indicative of the occurrence of electron paths partly in both regions and hence of incident radiation generally in the directions of the electron paths, separating the derived pulses in accordance with which region had the greater number of electrons coincidently produced therein as indicative of the sense of direction, and measuring the separated pulses as indicative of incident radiation having particular directions and senses of direction.

7. A method of detecting radiation that comprises subjecting a confined ionizable medium to radiation to produce therein ionization evidenced by electrons which define charged particle paths, the sense of direction of said paths being distinguishable by the lesser density of electrons at the beginning of each path; uniformly translating the electrons defining said paths toward an electron collector; collecting said electrons in the order of their initial distance from said collector, the nearest electrons being collected first, thereby producing electrical pulses having shapes indicative of the sense of direction of said paths; separating said pulses in accordance with pulse shape; and measuring said separated pulses.

8. A method of detecting radiation that comprises subjecting a confined ionizable medium to radiation to produce therein ionization evidenced by electrons which define charged particle paths, uniformly translating the electrons defining said paths toward an electron collector, collecting said electrons in the order of their initial distance from said collector, separating the electrical pulses thereby produced according to pulse duration, and measuring said separated pulses.

9. An apparatus for producing a neutron log of a well that comprises a source of fast neutrons; means for traversing the well with the source to effect bombardment of the formations with fast neutrons; means disposed adjacent said source and adapted for movement therewith for detecting fast neutrons which have been diffused by the formations and returned to the well, said detecting means comprising a housing, an ionizable medium in said housing, a collecting electrode, a plurality of ring electrodes, a screen dividing the region of the ring electrodes from the region of the collector electrode; means for placing a potential between the collector electrode and the housing and screen, and means for placing potentials between individual electrodes and the screen to provide a substantially uniform field in said region of ring electrodes; means for recording signals resulting from said detection in correlation with the depth at which detection occurred; and means for transmitting the signals from the detector to the recording means.

10. An apparatus for producing a neutron log of a well that comprises a source of fast neutrons; means for traversing the well with the source to effect bombardment of the formations with fast neutrons; means disposed adjacent said source and adapted for movement therewith for detecting fast neutrons which have been diffused by the formations and returned to the well, said detecting means being as recited in claim 9 further characterized by a plurality of collecting electrodes, and means for connecting the collecting electrodes in pairs to an external circuit; means for recording signals resulting from said detection in correlation with the depth at which detection occurred; and means for transmitting the signals from the detector to the recording means.

11. An apparatus for producing a neutron log of a well that comprises a source of fast neutrons; means for traversing the well with the source to effect bombardment of the formations with fast neutrons; means disposed adjacent said source and adapted for movement therewith for detecting fast neutrons which have been diffused by the formations and returned to the well, said detecting means having a pair of collecting electrodes adapted to separately collect electrons produced by the first and last portions of ionizing particle paths; means for distinguishing the first portion from the last portion; means for producing a signal indicative of the sense of direction of the ionizing particle; means for recording signals resulting from said detection in correlation with the depth at which detection occurred; and means for transmitting the signals from the detector to the recording means.

12. An apparatus for producing a neutron log of a well that comprises a source of fast neutrons; means for traversing the well with a source to effect bombarding with the formations of fast neutrons; means disposed adjacent said source and adapted for movement therewith for detecting fast neutrons which have been diffused by the formations and returned to the well, said detecting means comprising a housing, an ionizable medium in said housing, a point collecting electrode, a plurality of ring electrodes, a screen dividing the region of the ring electrodes from the region of the collector electrode, means for placing a potential between the collector electrode and the housing and screen, means for placing potentials between individual electrodes and the screen to provide a substantially uniform field in said region of ring electrodes, and masks for geometrically limiting the electrons entering the collecting region through the screen; means for recording signals resulting from said detection in correlation with the depth at which detection occurred; and means for transmitting the signals from the detector to the recording means.

13. An apparatus for producing a neutron log of a well that comprises a source of fast neutrons; means for traversing the well with the source to effect bombardment of the formations with fast neutrons; means disposed adjacent said source and adapted for movement therewith for detecting fast neutrons which have been diffused by the formations and returned to the well, said detecting means having a pair of collecting electrodes adapted to separately collect electrons produced by the first and last portions of ionizing particle paths, means for distinguishing the first portion from the last portion, means for producing a signal indicative of the sense of direction of the ionizing particle, and masks for geometrically limiting the electrons entering the collecting regions through the screens which divide the collecting regions from the region of ionization; means for recording signals resulting from said detection in correlation with the depth at which detection occurred; and means for transmitting the signals from the detector to the recording means.

14. A fast neutron detector that comprises in combination a housing, an ionizable medium in said housing, a point collecting electrode, a plurality of ring electrodes, a screen dividing the region of the ring electrodes from the region of the collector electrode, means for placing a potential between the collector electrode and the screen to produce a non-uniform electrical field in the region of the collecting electrode, means for placing potentials between individual ring electrodes and the screen to provide a substantially uniform electrical field in said region of ring electrodes and means for measuring signals resulting from detection.

15. A method of well logging that comprises bombarding the formations adjacent to the well with fast neutrons emitted by a source which emits neutrons in all directions, selectively detecting fast neutons traveling generally in directions transverse to the well to the exclusion of fast neutrons traveling generally longitudinally in the well amplifying signals produced by the detection, and recording a function of the amplified signals versus depth at which the detection occurred.

16. A system of producing a log of a drill hole that comprises in combination a source of fast neutrons, means disposed adjacent said source and adapted for movement therewith for detecting fast neutrons that have been diffused by the formations and returned to the well by producing electrical pulses, means for exclusively passing electrical pulses having predetermined shape to the exclusion of pulses of any other shape, means for producing a signal that is a function of the passed pulses, and means for recording the produced signal versus the depth at which detection occurred.

17. A system of producing a log of a drill hole that comprises in combination a source of fast neutrons, means disposed adjacent said source and adapted for movement therewith for detecting fast neutrons that have been diffused by the formations and returned to the well, by producing electrical pulses, a plurality of means for exclusively passing electrical pulses having different predetermined shape means for separately introducing the electrical pulses produced by detection into the passing means, means for separately producing signals that are functions of the respective passed pulses, means for combining the produced signals, and means for recording the combined signals versus the depth at which detection occurred.

18. A system of producing a log of a drill hole that comprises in combination a source of fast neutrons, means disposed adjacent said source and adapted for movement therewith for detecting fast neutrons that have been diffused by the formations and returned to the well by producing electrical pulses, means for exclusively passing electrical pulses having predetermined duration, means for producing a signal that is a function of the passed pulses, and means for recording the produced signal versus the depth at which detection occurred.

19. A fast neutron detector that comprises in combination a housing, an ionizable gas confined in said housing formed substantially of atoms of atomic weight less than 5, an electrostatic shield pervious to electrons dividing said gas into two regions, a collector of relatively small radius in one of said regions, means for applying potential between said collector and said shield with said collector relatively positive to create a non-uniform electric field therebetween, means for creating a uniform field in said other region to drive electrons therein through said shield, and means for measuring the pulses of electrons collecting on said collector.

20. A fast neutron detector that comprises in combination a housing, an ionizable gas confined in said housing formed substantially of helium containing a trace of polyatomic gas, an electrostatic shield pervious to electrons dividing said gas into two regions, a collector of relatively small radius in one of said regions, means for applying potential between said collector and said shield with said collector relatively positive to create a non-uniform electric field therebetween, means for creating a uniform field in said other region to drive electrons therein through said shield, and means for measuring the pulses of electrons collecting on said collector.

21. Apparatus for measuring fast neutron flux comprising a confined detection medium the atomic nuclei of which recoil upon being struck by fast neutrons and release detectable phenomena along the paths of said recoil nuclei in said medium, means for deriving different electrical signals from the successive parts of the phenomena along said paths, and means for combining said signals electrically to indicate the direction of travel of said recoil nuclei and hence of the neutrons which produce them.

References Cited in the file of this patent

UNITED STATES PATENTS

| | | |
|---|---|---|
| 2,469,460 | Fearon | May 10, 1949 |
| 2,483,139 | Herzog | Sept. 27, 1949 |
| 2,495,650 | Blair et al. | Jan. 24, 1950 |
| 2,566,089 | Linder | Aug. 28, 1951 |
| 2,617,945 | Lord et al. | Nov. 11, 1952 |

OTHER REFERENCES

Electronic, Classifying, Cataloging, and Counting Systems by J. Howard Parsons, AECD, 1827, declassified March 25, 1948.

Pulse Height Analyzer, Model A, by W. A. Higinbotham, MDDC, 1173, declassified August 8, 1947.